United States Patent [19]

Knight

[11] E

[45] Reissued

Patent Number: Re. 32,123

Date of Patent: Apr. 22, 1986

[54] DISCRIMINATORY HIT DETECTION IN TARGET APPARATUS

[75] Inventor: Lindsay C. Knight, Albury, Australia

[73] Assignee: Lomah Electronic Targetry, Inc., Boca Raton, Fla.

[21] Appl. No.: 645,032

[22] Filed: Aug. 27, 1984

Related U.S. Patent Documents

Reissue of:

[64] Patent No.: 4,349,729
Issued: Sep. 14, 1982
Appl. No.: 110,356
Filed: Jan. 8, 1980

[30] Foreign Application Priority Data

| | | | |
|---|---|---|---|
| Jan. 8, 1979 | [GB] | United Kingdom | 7900626 |
| Mar. 8, 1979 | [GB] | United Kingdom | 7908261 |
| Apr. 4, 1979 | [GB] | United Kingdom | 7911721 |
| May 14, 1979 | [AU] | Australia | PD8800 |
| Jul. 24, 1979 | [GB] | United Kingdom | 7925668 |

[51] Int. Cl.[4] ..... G06F 15/20; F41J 5/12; G06F 15/72

[52] U.S. Cl. ..... 235/400; 273/372; 364/423; 367/127; 367/906; 434/1

[58] Field of Search ..... 235/400; 364/423; 367/129, 906; 273/371, 372, 373; 434/1, 19, 23

[56] References Cited

U.S. PATENT DOCUMENTS

| | | | |
|---|---|---|---|
| 3,233,904 | 2/1966 | Gilliam et al. | 273/371 |
| 3,707,699 | 12/1972 | Sanctuary | 273/372 |
| 3,778,059 | 12/1973 | Rohrbaugh et al. | 273/372 |
| 3,788,748 | 1/1974 | Knight et al. | 273/371 |
| 4,261,579 | 4/1981 | Bowyer et al. | 273/372 |
| 4,281,241 | 7/1981 | Knight et al. | 235/400 |

FOREIGN PATENT DOCUMENTS

| | | |
|---|---|---|
| 7726275 | 3/1978 | Fed. Rep. of Germany . |
| 589835 | 5/1977 | Switzerland . |

*Primary Examiner*—Felix D. Gruber
*Attorney, Agent, or Firm*—Schwartz, Jeffery, Schwaab, Mack, Blumenthal & Evans

[57] ABSTRACT

A hit detection device for use in a marksmanship evaluation device for providing positive and negative reinforcement of shooting techniques immediately after each shot is fired. The hit detection device comprises a transducer spaced apart from a target member and detects and provides a hit indication output when the target is hit. In a preferred embodiment, the transducer in combination with electronic circuitry provide discrimination such that a hit indication output is only provided when the target member is actually hit by a projectile directly and no output is provided if the target is hit by a ricochet or is disturbed by any other external source such as the wind, sonic booms, etc. In a further preferred embodiment, the target member is three-dimensional and at least partially surrounds the transducer to shield the same from air pressure disturbances caused by projectiles passing by but not actually hitting the target member.

33 Claims, 46 Drawing Figures

DISCRIMINATORY HIT DETECTION IN TARGET APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an apparatus or determining information concerning the point in which a trajectory of the supersonic projectile passes through a predetermined measurement plane.

2. The Prior Art

When a projectile travels through the atmosphere with a supersonic velocity, a conically-expanding pressure or shock wave is generated, with the projectile being at the apex of the shock wave.

It has been proposed to provide apparatus for determining the position at which the trajectory of the projectile passes through a plane, employing transducers or the like to detect such a shock wave generated by a supersonic projectile. One such proposal is described in U.S. Pat. No. 3,778,059 (Rohrbaugh).

Other target systems are disclosed in Swiss Patent Specification Ch-PS No. 589,835, granted May 15, 1977, to Walti, and German Utility Model DE-GM No. 77 26 275 of Walti, laid open Mar. 16, 1978. Other prior art systems are known, as well, but none provides comprehensive training in proper marksmanship. The prior art target arrangements provide only partial information to the marksman about the progress of his shooting. For example, the aforementioned prior art references provide systems which determine a location at which a projectile fired at a target passes relative to the target. U.S. Pat. No. 3,233,904 offers an automatic target apparatus having an impulse switch for detecting projectile hits on a target and initiating operation of a target mechanism which drops the target from a fully raised to a fully lowered position.

SUMMARY OF THE INVENTION

The present invention provides a considerably more versatile and sophisticated system for training in marksmanship than has heretofore been proposed. In order to more effectively instruct trainees in marksmanship training, it is advantageous to provide positive and negative reinforcement of shooting techniques immediately after each shot is fired. Such reinforcement may take a number of forms, but preferably comprises a plurality of indications concerning each shot fired. For example, it is desirable to provide the marksman with an at least approximate indication of where a projectile fired at a target has passed relative to the target and/or a positive indication of whether the projectile has actually hit the target and/or whether the projectile has ricocheted prior to reaching the zone of the target. It is also advantageous to provide, in combination with one of the foregoing indications, information concerning whether the marksman is correctly gripping the weapon being fired. The marksmanship training system is particularly effective for beginning marksmen who may not be holding the weapon correctly and who may now even be shooting sufficiently near the target to score a "hit." Such a marksman is thus apprised of the manner in which he should change his technique to improve his shooting. The system is, however, also effective for more advanced shooters, who may wish to not only have an indication that the target has been hit by a projectile, but whether the projectile has struck a particular region of the target.

A first form of the invention relates to an apparatus for use in marksmanship training in which a projectile travels along a trajectory from a firing point toward a target member and through a measurement plane. The apparatus detects and indicates relative to a target representation a location in the measurement plane through which the trajectory passes, thereby providing at least an approximate indication of where the projectile passes relative to the target member. The present invention further detects and provides a positive indication of a projectile "hit" on the target member. In this way, a marksman is provided with at least an approximate indication of where the projectile passes as well as a positive indication of whether the projectile has hit the target, the indications making it a simple matter for the marksman to distinguish hits at the edge of the target from misses near the edge of the target.

A further form of the invention provides the marksman with at least an approximate indication of where the projectile passes relative to the target member, a positive indication of a projectile hit on the target member, and an indication of whether a detected hit on the target has resulted from a free flight (i.e., non-ricocheting) projectile hitting the target or from a projectile which has ricocheted prior to hitting the target. Such a system, particularly for beginning trainees who may not even realize that shots are being fired slightly below the target and ricocheting up into the region of the target. Absent some means of determining positively whether the projectile has ricocheted, a "ricochet hit" on the target may be indicated as simply a "hit" on the target, providing the marksman erroneously with positive reinforcement of incorrect shooting technique.

According to one particularly advantageous form of the invention, the apparatus for detecting a hit on the target comprises a device, such as a transducer, spaced apart from and not physically connected to the target member for detecting and selectively providing a hit indication only in response to disturbance of the target member caused by a projectile hitting the target member. This particulaar apparatus for hit detection is intended to overcome problems with some prior art systems in which stones kicked up by bullets ricocheting off the ground in front of the target sometimes erroneously provide a "hit" indication, such as when kicked-up stones hit the target but the ricocheting projectile does not. When used with supersonic projectiles, it is intended that this hit detection arrangement comprise a transducer located in front of the target relative to the flight path of the projectile and shielded in such a manner as to detect air pressure disturbances caused by the projectile hitting or passing through the target, but not disturbances caused by the airborne shock wave of the supersonic projectile. Alternatively the transducer is located behind a 3-dimensional target and at least partially shielded from the airborne shock wave of a supersonic projectile by the target member itself.

One particularly advantageous arrangement is the combination of the hit detection device and a means for indicating the location in a measurement plane through which the trajectory of a supersonic projectile passes is also provided. The arrangement includes an array of at least three transducers responsive to an airborne shock wave from the supersonic projectile and located at respective predetermined positions spaced along a line substantially parallel to the measurement plane. Apparatus is provided for measuring velocity of the supersonic projectile and for measuring velocity of propagation of sound in air in the vicinity of the array of transducers. Computing apparatus is responsive to the transducer array and the projectile velocity and propagation velocity measuring apparatus, and determines the location in the plane through which the trajectory of the supersonic projectile passes, and provides an output indicating the determined location.

Also contemplated within the scope of the invention is the hit detector combined with some form of graphic display for providing the desired positive and negative reinforcement to each marksman for each shot fired. For example, a visual display screen may be provided with a representation of the target fired upon, relative to which is displayed an indication of where the projectile has passed by or struck the target. Since it may at times be difficult to distinguish between hits at the edge of the target and near misses at the edge of the target, it is desired to provide supplemental positive indication of whether a hit has been detected. It is also contemplated to provide an indication of the region of a target which has been hit, as well as to provide a positive indication of whether the projectile has ricocheted. Useful for competitive shooting situations is a graphic display of the marksman's score for each shot fired and total score for a grouping of shots fired.

It will be seen from the description which follows with reference to the drawing figures and computer program appendices that the present invention provides a comprehensive marksmanship training system which is both versatile and sophisticated, and which provides a level of training that has heretofore been unknown in the field.

The present specification relates to co-pending U.S. patent applications Ser. Nos. 110,481, 110,471, 110,498 and 110,492 all filed Jan. 8, 1980, claiming priority from the same foreign references as the present specification.

DETAILED DESCRIPTION OF PREFERRED EMBODIMENTS

Figure 1:
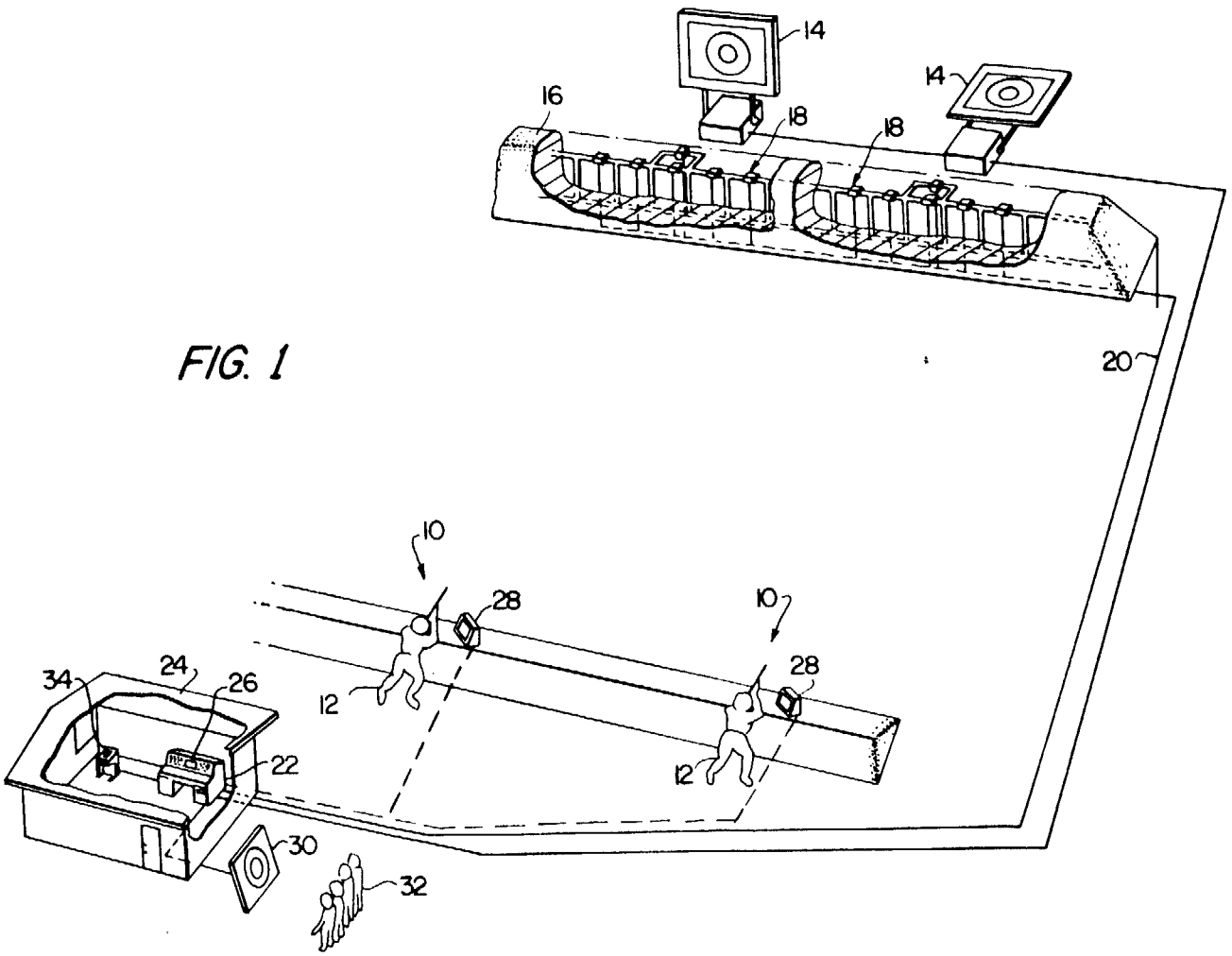
FIG. 1 shows in perspective view a marksmanship training range employing concepts of the present invention.

FIG. 1 shows in perspective view a marksmanship training range employing concepts of the present invention. The range has a plurality of firing points 10 from which trainee marksman 12 shoot at targets 14. Located in front of the targets 14 is, for example, an earthen embankment which does not obstruct the marksman's view of targets 14 from the firing points, but which permits the positioning of transducer arrays 18 just below the lower edge of the target and out of the line of fire. The transducer arrays will be described in more detail below, but it will be understood that they may be connected by suitable cables to a computer 22 situated in a control room 24 located behind the firing points, as shown, or may alternatively be connected to a data processor or computer (not shown) located near the transducer array, which is in turn coupled to the visual display units. As will be explained below, each transducer array detects the shock wave generated by a supersonic projectile, such as a bullet, fired at the respective target, and the computer 22 is operative to determine the location in a measurement plane in front of the target through which the bullet trajectory passes. Means (not shown in FIG. 1) are provided at each target for detecting when the target has been "hit" by a projectile. Computer 22 is coupled to suitable visual display unit 26, 28, 30, located respectively in the control room 24, at each firing point 10, and at one or more other locations 30. Provided on the visual display units may be, for example, an approximate indication, relative to a target representation, of where the projectile has passed through the measurement plane, and an indication of whether the target has been "hit" by the projectile. Spectators 32 may observe the progress of shooting of one or more of the marksmen on visual display unit 30. The computer may be coupled with a suitable printer or paper punching device 34 to generate a permanent record of the bullet trajectory location determined by the computer.

Figure 2:
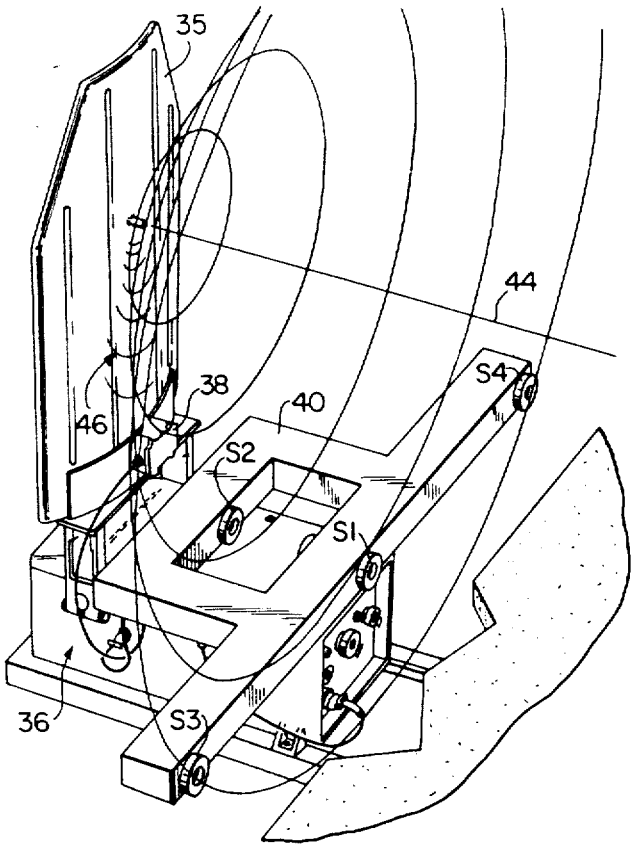
FIG. 2 shows in perspective view a target mechanism equipped with a target member, a hit sensor, and transducers for detecting an airborne shock wave.

Although the targets 14 shown in FIG. 1 have marked thereon representations of the conventional bull's-eye type target, the target may be of any suitable configuration, such as a rigid or semi-rigid target member 35 as shown in FIG. 2 on which may be provided the outline of a soldier or the like. Means are provided for detecting when a projectile fired at the target member has "hit" the target member, and the target member may be mounted on a target mechanism 36 which is operative to lower the target out of sight of the trainee when a "hit" is detected. The "hit" detecting means may be an inertia switch 38 as shown in FIG. 2, or any other suitable apparatus. Alternative "hit" detecting arrangements will be described below. The automated target mechanism may be of the type described in U.S. Pat. No. 3,233,904 to GILLIAM et al. (the content of which is incorporated herein by reference). Target mechanisms of this type are available commercially from Australasian Training Aids Pty. Ltd., Albury, N.S.W. 2640, Australia, Catalog No. 106535. Inertia switches are commercially available from Australasian Training Aids Pty. Ltd., Catalog No. 101805.

In the arrangement of FIG. 2, transducers S1–S4 are mounted on a rigid support member 40, which is in turn mounted on the target mechanism 36. Although the transducer arrays 18 may be supported separately from the target mechanism beneath targets 14 (as in FIG. 1), affixing the transducer arrary to the target mechanism as in FIG. 2 assure correct alignment of the measurement plane relative to target member 35. Transducers S1–S4 (FIG. 2) preferably each comprise a disk-shaped piezoelectric element of 5 mm diameter mounted to a hemispherical aluminum dome, the hemispherical surface of the dome being exposed for receiving the shock wave from the bullet. The airborne shock wave generated by the bullet is represented by the series of expanding rings 42, the bullet trajectory by a line 44, and the acoustic vibrations induced in the target member 35 on impact of the bullet by arc segments 46.

Figure 3:
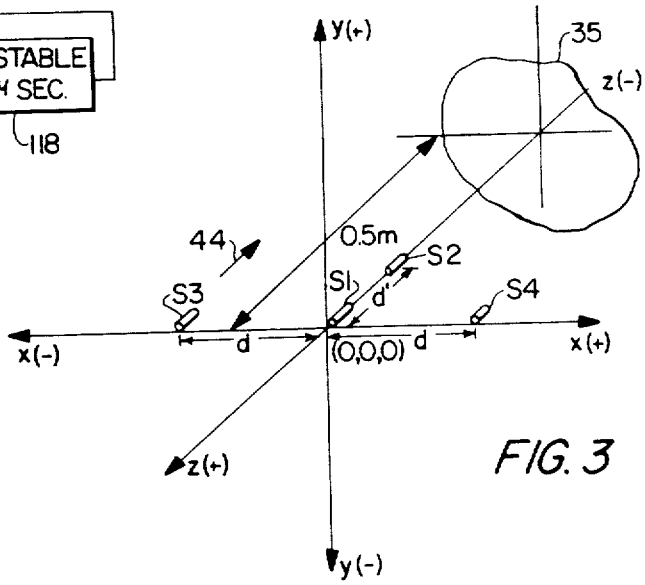
FIG. 3 shows a coordinate system relating the positions of shock wave-sensing transducers.

FIG. 3 shows a three-dimensional coordinate system in which the positions of the four transducers S1–S4 are related to a reference point (0, 0, 0). The transducer array illustrated is similar to that shown in FIG. 2, with a row of three transducers S1, S3, S4 situated at spaced locations along the X axis and with a fourth transducer S2 situated at a spaced location behind transducer S1 along the Z-axis. A portion of target member 35 is also shown for reference purposes, as is an arrow 44 representing the bullet trajectory. The distance along the X-axis from transducer S1 to transducers S3 and S4, respectively, is represented by distance d. The distance along the Z-axis between transducers S1 and S2 is represented by d'.

The X-Y plane intersecting the origin of the Z axis of the coordinate system shown in FIG. 3 is considered to be the measurement plane in which the location of the trajectory is to be determined.

Transducers S1–S4 provide output signals in response to detection of the shock wave of the bullet, from which the location in the measurement plane through which the projectile trajectory passes can be determined. A mathematical anaylsis is provided below for a relatively simple case in which it is assumed that:

(1) The transducer array is as shown in FIG. 3;

(2) The measurement plane has its X-axis parallel to the straight line joining transducers S1, S3, S4;

(3) The projectile trajectory is normal to the measurement plane;

(4) The projectile travels with constant velocity;

(5) Air through which the shock wave propagates to strike the transducers is (a) of uniform and isotropic shock wave propagation velocity, and (b) has no velocity (i.e., wind) relative to the transducer array; and (6) The shock wave propagation velocity and projectile velocity are separately measured or otherwise known or assumed.

It is noted that small departures from the above-stated conditions have in practice been found acceptable, since the resulting error in calculated location in the measurement plane through which the projectile passes is tolerably small for most applications.

The respective times of arrival of the shock wave at transducers S1, S2, S3, S4 are defined as T1, T2, T3, and T4. All times of arrival are measured with respect to an arbitrary time origin. $V_s$ is defined as the propagation velocity of the shock wave front in air in a direction normal to the wave front, while $V_B$ is defined as the velocity of the supersonic projectile along its trajectory.

The velocity $V_B$ of the bullet in a direction normal to the measurement plane can be determined from the times of arrival $T_1$, $T_2$ of the shock wave at transducers S1 and S2 and from the distance d' between transducers S1 and S2;

$$V_B = d'/T_2 - T_1 \tag{1}$$

Then the propagation velocity of the shock wave front in a direction normal to the projectile velocity may be defined as:

$$V_N = \frac{V_s}{1 - \frac{V_s}{V_B}2} \tag{2}$$

The differences between the times of arrival of the shock wave may be defined as:

$$t_1 = T_3 - T_1 \tag{3}$$

$$t_2 = T_4 - T_1 \tag{4}$$

The X-axis coordinate of the intersection point of the projectile trajectory with the measurement plane is:

$$X = \frac{(t_1 - t_2)(V_N^2 t_1 t_2 + d^2)}{2d(t_1 + t_2)} \tag{5}$$

The distance in the measurement plane from sensor S1 to the point of intersection of the projectile trajectory with the measurement plane is:

$$i_o = \frac{[2d^2 - V_N^2(t_1^2 + t_2^2)]}{2V_N(t_1 + t_2)} \quad (6)$$

The Y-axis coordinate of the intersection point of the bullet trajectory with the measurement plane is:

$$y = l_o^2 - x^2 \quad (7)$$

It is possible to construct a mathematical solution for the above-described transducer system which incorporates such effects as:

(1) Wind;
(2) Non-equally spaced transducers along the X-axis;
(3) Non-colinear arrays;
(4) Decelerating projectiles; and
(5) Non-normal trajectories.

However, most of these corrections require more complex arithmetic, and in general can only be solved by iterative techniques.

It can be seen that the transducer arrangements shown in FIGS. 1-3 form, when viewed in plan, a "T" configuration with at least three transducers on the crossbar of the "T" and one transducer at the base of the "T." The stem of the "T" is substantially aligned with the expected bullet trajectory. The error created if the stem of the "T" is not precisely aligned with the anticipated projectile trajectory is relatively minor and thus the alignment of the "T" can be considered substantially insensitive to error. However, the stem of the "T" (that is, the Z-axis of FIG. 3) is aligned parallel to the expected projectile trajectory, the effect is to cancel substantially any shock wave-arrival-angle dependent time delays in the transducer outputs.

Figures 4, 5:
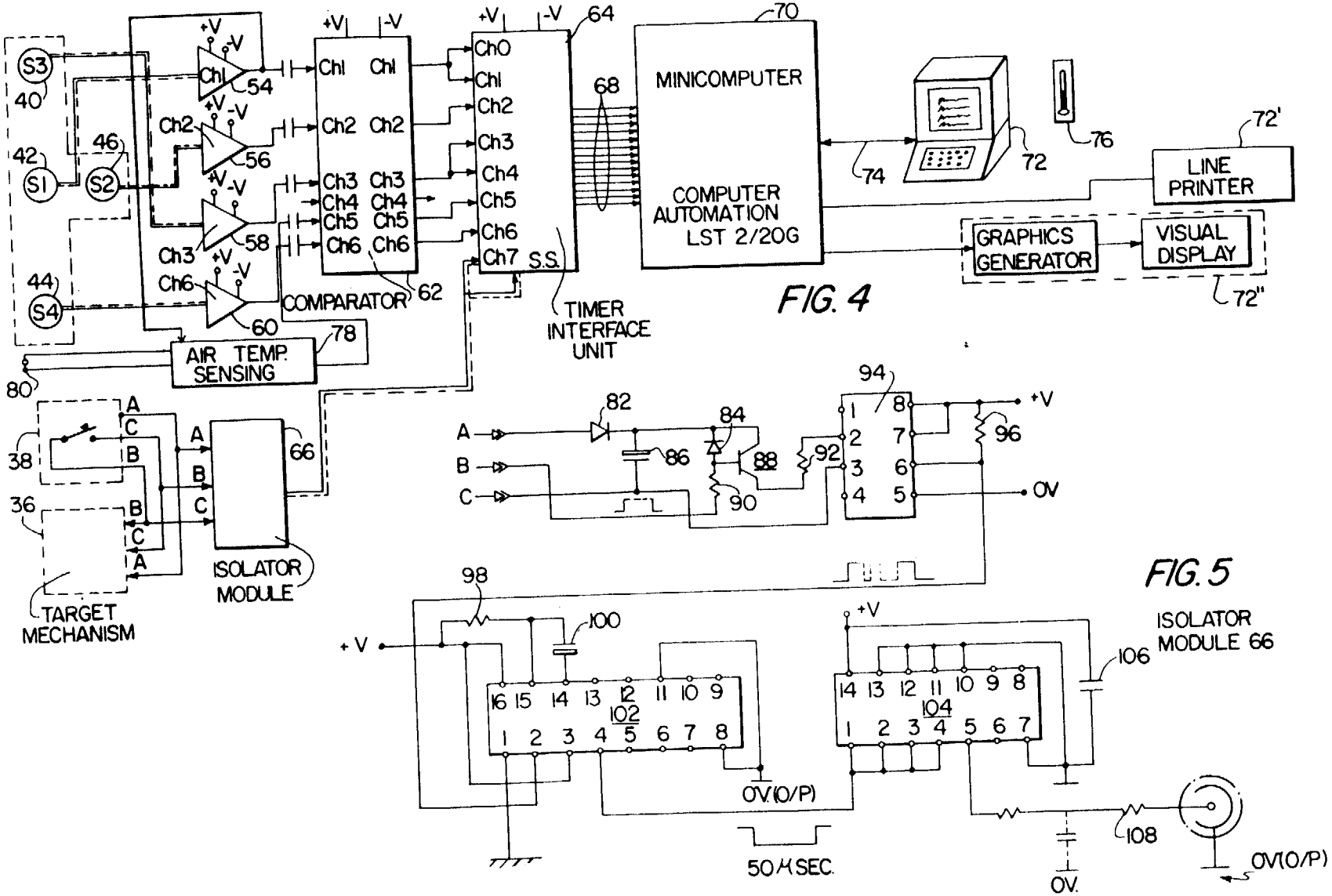
FIG. 4 shows a schematic block diagram of an overall system in accordance with the invention.
FIG. 5 shows an isolator module circuit for block 66 of FIG. 4.

Referring now to FIG. 4, a plan view of the transducers S1-S4 in a "T" configuration is illustrated schematically. Each transducer is coupled by an appropriate shielded cable to a respective one of amplifiers 54-60. The outputs of amplifiers 54-60 are provided through coupling capacitors to respective inputs of a multi-channel comparator unit 62, each channel of which provides an output when the input signal of that channel exceeds a predetermined threshold level. Thus, a pulse is provided at the output of each of channels 1, 2, 3, and 6 of comparator unit 62 at respective times indicating the instants of reception of the shock wave at each of the transducers S1-S4. In the presently-described form of the invention, channel 4 of the six-channel comparator unit is unused. The outputs of channel 1-3 and 6 of comparator unit 62 are provided to inputs of a timer interface unit 64. Timer interface unit 64 serves a number of functions, including conversion of pulses from comparator unit 62 into digital values representing respective times of shock wave detection which are conveyed via a cable 68 to a minicomputer 70.

The output of channel 1 of comparator unit 62 is coupled to the inputs of channels 0 and 1 of timer interface unit 64, the output of channel 2 of the comparator unit is coupled to the input of channel 2 of the timer interface unit, the output of channel 3 of the comparator unit is coupled to the inputs of channels 3 and 4 of the timer interface unit, and the output of channel 6 of the comparator unit is coupled to the input of channel 6 of the timer interface unit. The channel 5 input of the timer interface unit is coupled via comparator unit channel 5 to an air temperature sensing unit 78 which has a temperature-sensitive device 80 for measuring the ambient air temperature. The output of amplifier 54 is also provided to air temperature sensing unit 78, for purposes described below with reference to FIGS. 10A-10D.

FIG. 4 also shows schematically the target mechanism 36 and the inertia switch 38 of FIG. 2, which are interconnected as shown for the units available from Australasian Training Aids Pty., Ltd. Coupled to terminals A, B, C of the target mechanism/ inertia switch interconnection is an isolator module 66 which provides a pulse similar in form to the output pulses of comparator unit 62 when inertia switch 38 is actuated by impact of a projectile on the rigid target member 35 of FIG. 2. The output of isolator module 66 is supplied to two remaining inputs of timer interface unit 64, indicated in FIG. 4 as channels 7 and "S.S."

Minicomputer 70 of FIG. 4 may be of type LSI2/20G, available from Computer Automation Inc. of Irvine, California, Part No. 10560-16. The basic LSI2/20G unit is preferably equipped with an additional memory board available from Computer Automation, Part No. 11673-16, which expands the computer memory to allow for a larger "BASIC" program. Minicomputer 70 is preferably also equipped with a dual floppy disk drive available from Computer Automation, Part No. 22566-22, and a floppy disk controller available from Computer Automation, Part No. 14696-01. Minicomputer 70 is coupled to a terminal 72 having a visual display screen and a keyboard, such as model "CONSUL520" available from Applied Digital Data Systems Inc. of 100 Marcus Boulevard, Hauppauge, New York 11787, U.S.A. The CONSUL 520 terminal is plug-compatible with the LSI-2 minicomputer. Other peripheral units which are not necessary for operation of the system in accordance with the invention, but which may employed to provide greater flexibility in marksmanship training, include a line printer 72' for generating permanent output records, and a graphics generator/visual display unit combination 72" which permits the coordinates of the intersection point of the projectile trajectory with the measurement plane to be displayed relative to a representation of the target, as well as an indication of whether the target has been "hit" and a tally of the marksman's "score." Graphics generator/visual display unit 72" may be, for example, Model MRD "450", available from Applied Digital Data Systems, Inc., which is plug-compatible with the LSI-2 minicomputer.

Also shown in FIG. 4 is a thermometer 76, which preferably a remote-reading digital thermometer such as the Pye-Ether series 60 digital panel meter Ser. No. 60-4561-CM, available from Pyrimetric Service and Supplies, 242-248 Lennox St. Richmond, Victoria 3221, Australia, equipped with an outdoor air temperature sensor assembly (Refrence Job. No. Z9846). The remote-reading digital thermometer may have its sensor (not shown) placed in the region of the transducer array and, if the system is not equipped with the air temperature sensing unit 78 shown in FIG. 4, the operator of terminal 72 may read the remote-reading digital thermometer 76, and input a value for the air temperature. An approximate value for the speed of the shock-wave front propagation in ambient air can be readily calculated from the air temperature using a known formula as described below.

FIG. 5 shows a circuit diagram of the intertia switch isolator module 66 of FIG. 4, having inputs A, B, C coupled as in FIG. 4 to the commercially-available inertia switch. The isolator module provides DC isolation for the inertia switch output signal and presents the signal to timer interface unit 64 of FIG. 4 is a format comparable to the output signals from comparator unit 62.

Suitable components for isolator module 66 are:

| | | |
|---|---|---|
| 82,84 | 1N914 | |
| 86 | 47μF | |
| 88 | BC177 | |
| 90 | 10KΩ | |
| 92 | 820Ω | |
| 94 | 5082-4360 | |
| 96 | 470Ω | |
| 98 | 6.8KΩ | |
| 100 | 10μ F | |
| 102 | 74LS 221N | Monostable Multivibrator with Schmitt-trigger inputs |
| 104 | DS8830N | Differential line driver |
| 106 | 0.22μF | |
| 108 | 47Ω | |

Figure 6:
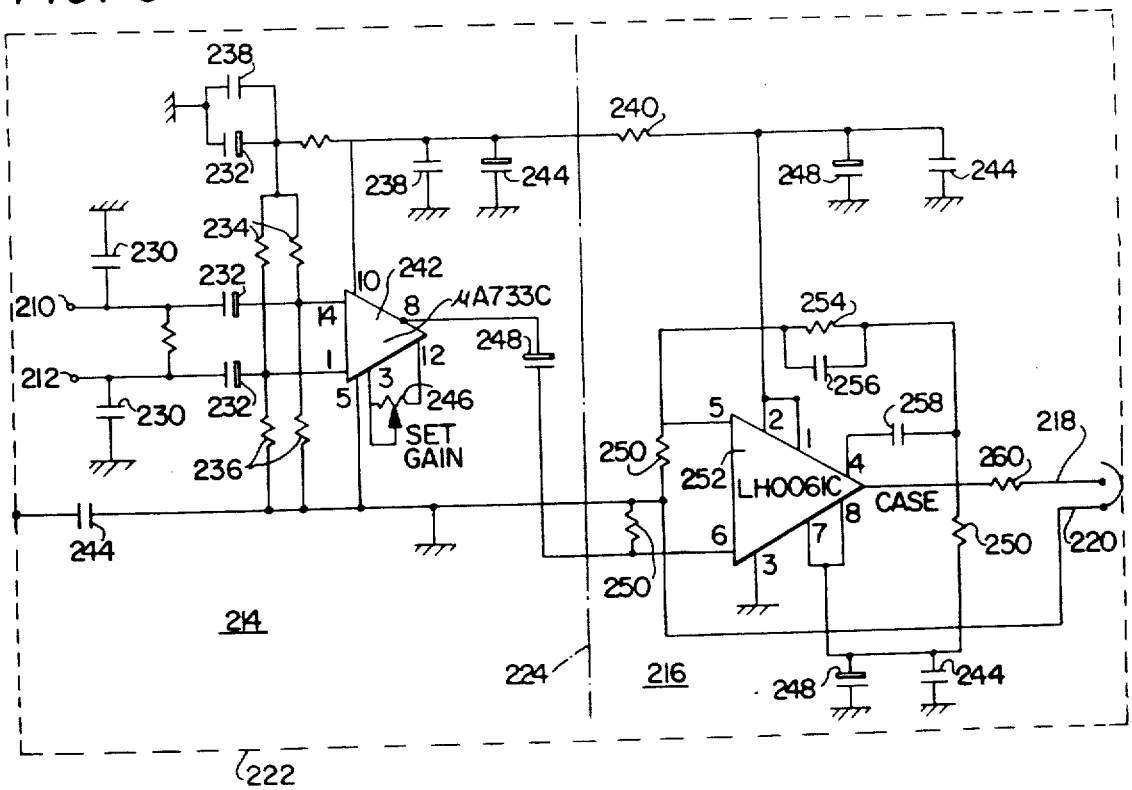
FIG. 6 shows a circuit arrangement for one of amplifiers 54–60 of FIG. 4.

FIG. 6 shows a suitable circuit arrangement for one of the amplifiers 54–60 of FIG. 5. Terminals 210 and 212 are connected to the leads of a respective one of transducers S1–S4 by a coaxial cable, and the transducer output signal proceeds through an input stage 214 and an output stage 216 to output terminals 218, 220. The grounds indicated are local circuit grounds isolated from amplifier case 222. A screen 224 is preferably provided between input and output stages, and is not in electrical contact with case 222. Suitable component values are:

| | | |
|---|---|---|
| 230 | 15pF | |
| 232 | 1μF | |
| 234 | 39KΩ | |
| 236 | 47KΩ | |
| 238 | 0.01 | |
| 240 | 10 | |
| 242 | μA733C | Integrated Circuit |
| 244 | 0.047 | |
| 246 | 20Ω | Variable |
| 248 | 10μF | |
| 250 | 1KΩ | |
| 252 | LH0061C | Integrated Circuit |
| 254 | 18KΩ | |
| 256 | 2.2pF | |
| 258 | 1000pF | |
| 260 | 51Ω | |

Figure 7:
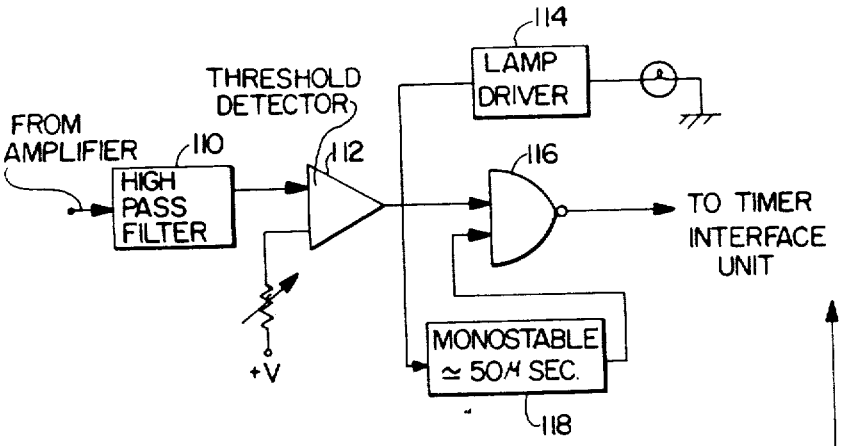
FIG. 7 shows in block schematic form one channel of comparator 62 of FIG. 4.

FIG. 7 shows a block diagram of one channel of comparator unit 62. The output signal from one of amplifiers 54–60 (FIG. 6) is provided through a high pass filter 110 to one input of a differential amplifier 112 which serves as a threshold detector. The remaining input of differential amplifier 112 is provided with a preset threshold voltage of up to, for example, 500 millivolts. The output of threshold detector 112 is supplied to a lamp driver circuit 114, to one input of a NAND gate 116 and to the trigger input of a monostable multivibrator 118 which provides an output pulse of approximately 50 millisecond duration. A shaped output pulse is therefore provided from NAND gate 116 in response to detection of the airborne shock wave by one of transducers S1–S4. Lamp driver circuit 114 may optionally be provided for driving a lamp which indicates that the associated transducer has detected a shock wave and produced an output signal which, when amplified and supplied to threshold detector 112, exceeds the preset threshold value.

Figure 8:
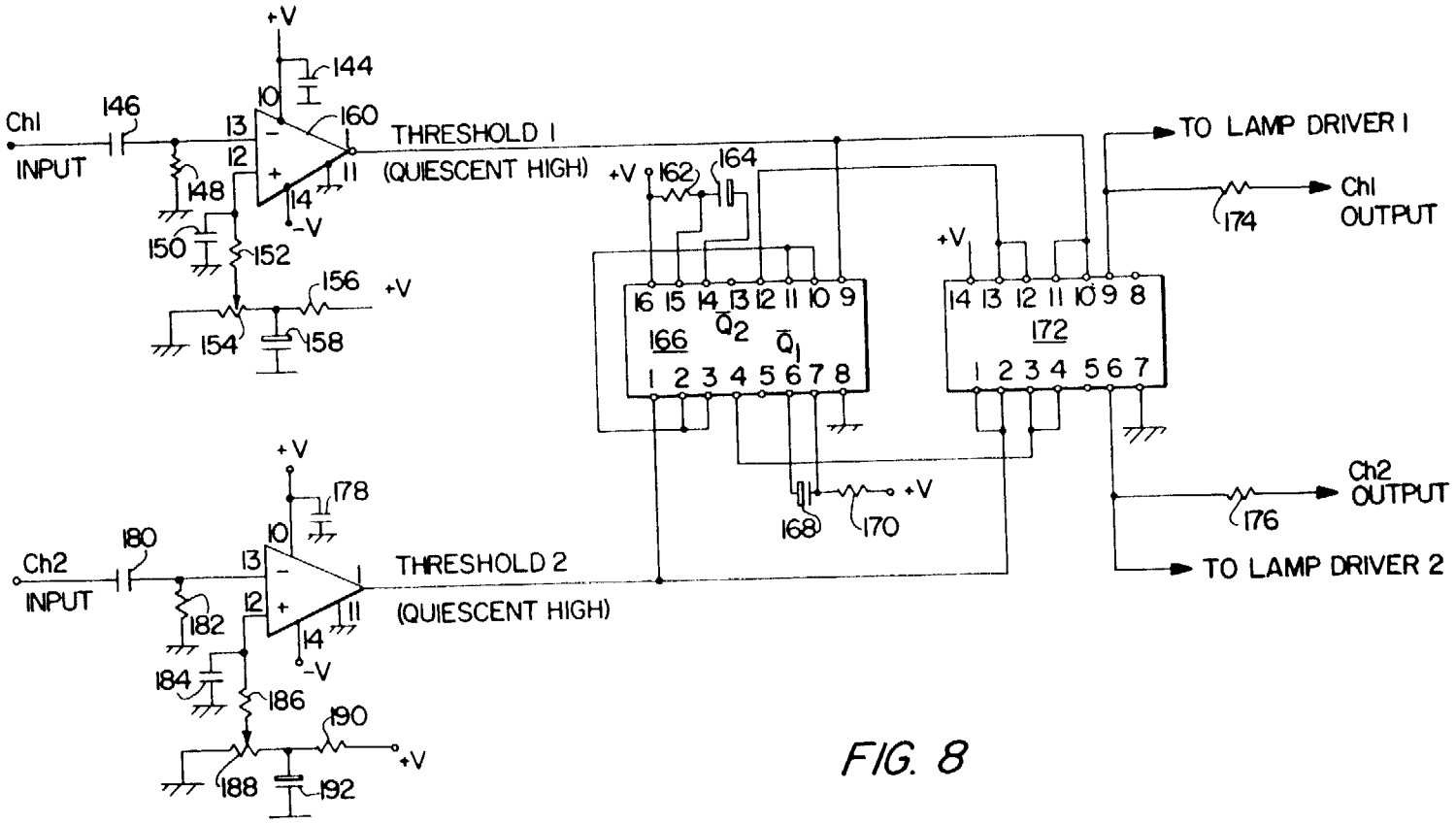
FIG. 8 shows in detailed circuit form two channels of comparator 62 of FIG. 4.

FIG. 8 shows two channels of comparator units 62. When a positive-going signal is received on the channel 1 input of FIG. 8, it drives the output of differential amplifier 160 from a quiescent high level to a low level, thereby supplying a "timing edge" to the trigger input (pin 9) of a monostable multivibrator comprising one half of integrated circuit chip 166, and to AND gate inputs (pins 10, 11) of integrated circuit chip 172. The output of monostable multivibrator of integrated circuit chip 166 (pin 12) comprises a negative-going pulse of predetermined duration which is provided to further inputs (pins 12, 13) of the channel 1 AND gate of integrated circuit chip 172. The output of the channel 1 AND gate of integrated circuit 172 comprises a negative-going pulse having a very fast transition-time leading edge.

Suitable components for the two-channels of comparator unit 62 shown in FIG. 8 are;

| | | |
|---|---|---|
| 144 | 0.1μF | |
| 146 | 10μF | |
| 148 | 2KΩ | |
| 150 | 10μF | |
| 152 | 2.2KΩ | |
| 154 | 100Ω | Variable |
| 156 | 1KΩ | |
| 158 | 1μF | |
| 160,161 | LM1514 | Differential Amplifier |
| 162 | 6.8KΩ | |
| 164 | 10μF | |
| 166 | 74LS 221N | Dual Monostable Multivibrator |
| 168 | 10μF | |
| 170 | 6.8KΩ | |
| 172 | DS 8830N | Dual Differential Line Driver |
| 174,176 | 47Ω | |
| 178 | 0.1μF | |
| 180 | 10μF | |
| 182 | 2KΩ | |
| 184 | 10μF | |
| 186 | 2.2KΩ | |
| 188 | 100Ω | Variable |
| 190 | 1KΩ | |
| 192 | 1μF | |

The logic output signals of comparator unit 62 cause counters in timer interface unit 64 to count numbers of precision crystal-controlled clock pulses corresponding to the differences in times of arrival of the logic-output signals, which in turn correspond to the times of arrival of the shock waves at the transducers. Once this counting process is complete and all channels of the timer interface unit have received signals, the counter data is transferred on command into the computer main memory. Following executive of a suitable program (described below), the resulting projectile trajectory data is displayed on the visual display unit 72 and/or units 72', 72'' of FIG. 4.

Figure 9A:
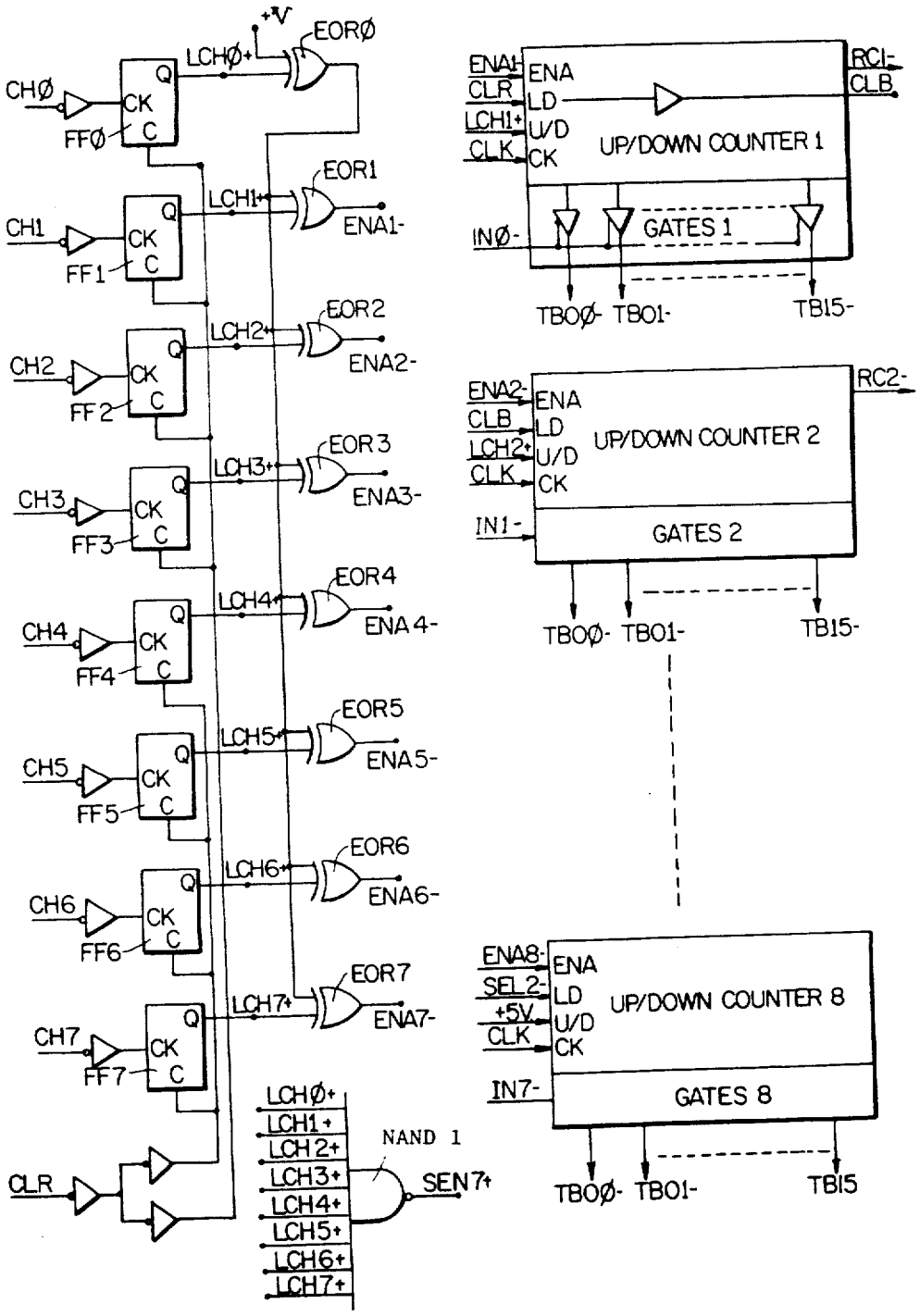
FIGS. 9A–9H show in detail one possible form of timer interface 64 of FIG. 4.

FIGS. 9A–9H show in detail one possible form of a timer interface unit 64, which converts time differences between the fast logic edge pulses initiated by the transducers into binary numbers suitable for processing by minicomputer 70. FIG. 9A shows the input and counting circuit portions of inner interface unit, which accept timing edges from respective comparator unit channels and generate time difference counts in respective counters. The timer interface unit has eight channel inputs labeled Ch0–Ch7 and one input labeled "S.S.", receiving signals as follows:

| Timer Interface Input Channel No. | Receives Signals initiating from |
|---|---|
| 0 | Transducer S1 |
| 1 | Transducer S1 |
| 2 | Transducer S2 |
| 3 | Transducer S3 |
| 4 | Transducer S3 |
| 5 | Air Temperature Sensing Unit 78, if equipped; otherwise Transducer S4 |
| 6 | Transducer S4 |
| 7 | Inertia Switch Isolator Module 66 |
| S.S. | Inertia Switch Isolator Module 66 |

The input signals to each of timer interface inputs Ch0–Ch7 comprise logic signals which are first buffered and then supplied to the clock input CK of respective latches FF0–FF7. The latch outputs LCH0+ through LCH7+ are provided, as shown, to exclusive OR gates EOR1–EOR7, which in turn provide counter enabling signals ENA1− through ENA7−. Latches FF0–FF9 are cleared upon receipt of clear signal CLR. The input and counting circuits also include a respectively up/down counter for each of eight channels (indicated for channel 1 as "UP/DOWN COUNTER 1"). Each up/down counter comprises, for example, four series-connected integrated circuits of type 74191. Each of up/down counters 1–8 thus has 16 binary outputs, each output coupled to a respective one of terminals TBO0− through TB15− via a controllable gate circuit (indicated for channel 1 as "GATES 1") on receipt of a command signal (indicated for channel 1 as "IN0−"). Up/down counter 1 is connected to receive latch signal LCH1+, enable signal ENA1− a clock signal CLK, and a clear signal CLR, and to provide a ripple carry output signal RC1− when an overflow occurs. Up/down counters 2–8 each receive a respective one of enable signals ENA2− through ENA8−. Counter 2 receives its clear signal CLB from counter 1; counters 3 and 5 receive clear signal CLR and provide clear signals CLB to counters 4 and 6, respectively; counter 7 receives clear signal CLR; and counter 8 receives clear signal SEL2−. The up/down inputs of counters 2–7 receive latch signals LCH2+ through LCH7+, respectively, while the up/down input of counter 8 is permanently connected to a +5 volt source. Counters 2–8 each receive a clock signal CLK, while each of counters 2–7 provide a ripple carry signal (RC2− through RC7−, respectively) when the respective counter overflows. Gates 2–8 are coupled to receive respective command signals IN1− through IN7− for passing the counter contents to terminals TBO0− through TB15−. FIG. 9A also shows a gate NAND 1 which receives the latch outputs LCH0+ through LCH7+ and provides an output signal SEN7+, the purpose of which is explained below.

Figure 9B:
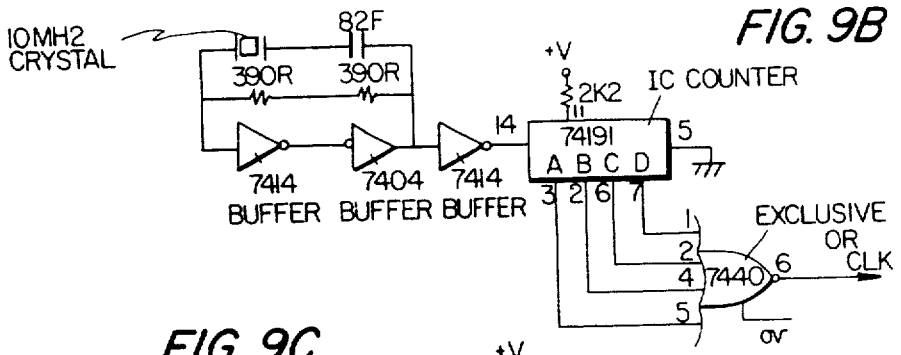

FIG. 9B shows a circuit for providing clock signal CLK for up/down counters 1–8. The clock frequency is, for example, about 5 MHz for the following components:

| | | |
|---|---|---|
| 300 | 10MHz | Crystal |
| 302 | 82F | |
| 304 | 390Ω | |
| 306 | 74191 | IC Counter |
| 308 | 2.2 KΩ | |
| 310 | 7414 | Buffer |
| 312 | 7404 | Buffer |

-continued

| | | |
|---|---|---|
| 314 | 7440 | Exclusive OR gate |

Figure 9C:
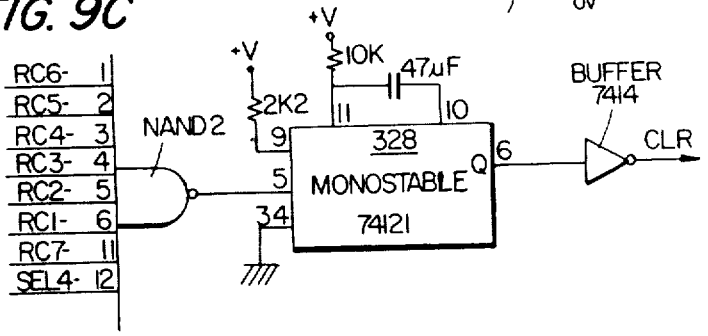

FIG. 9C shows a circuit for providing clear signal CLR, which resets input latches FF0–FF7 and up/down counters 1–7. When one of ripple carry outputs RC1− through RC7− of up/down counters 1–7 goes to a logic low level, indicating that a counter has overflowed, or when a reset signal SEL4− is provided from one computer, gate NAND 2 triggers a monostable element which then provides clear signal CLR in the form of a logic pulse to clear up/down counters 1–7 and input latches FF0–FF7 of FIG. 9A.

The components of FIG. 9C are, for example

| | | |
|---|---|---|
| 320 | 2.2KΩ | |
| 322 | 10KΩ | |
| 324 | 47μF | |
| 326 | 7414 | Buffer |
| 328 | 74121 | Monostable |

Up/down counters 1–7 are reset by signal SEL4− from the computer before each shot is fired by a trainee marksman. When a shot is fired, each counter will count down or up depending on whether its associated channel triggers before and after a reference channel, which in this case is input channel Ch0.

Figure 9D:
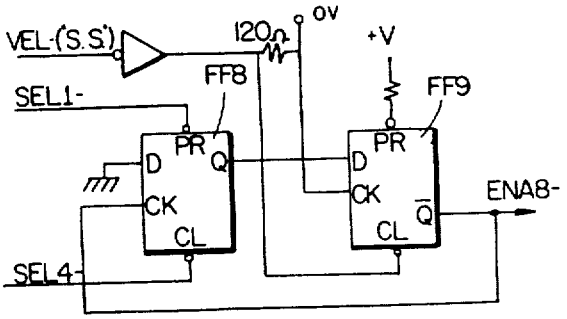

FIG. 9D shows the input circuitry for input "S.S" of the timer surface interface. Latch FF8 is coupled to receive reset signal SEL4− and preset signal SEL1− from the interface controller of FIGS. 9F and 9G in response to computer commands. Timer interface input "S.S." receives "hit" indication signal VEL− from the inertia switch isolator module 66, and provides a counter enable signal ENA8− for up/down counter 8.

Figure 9G:
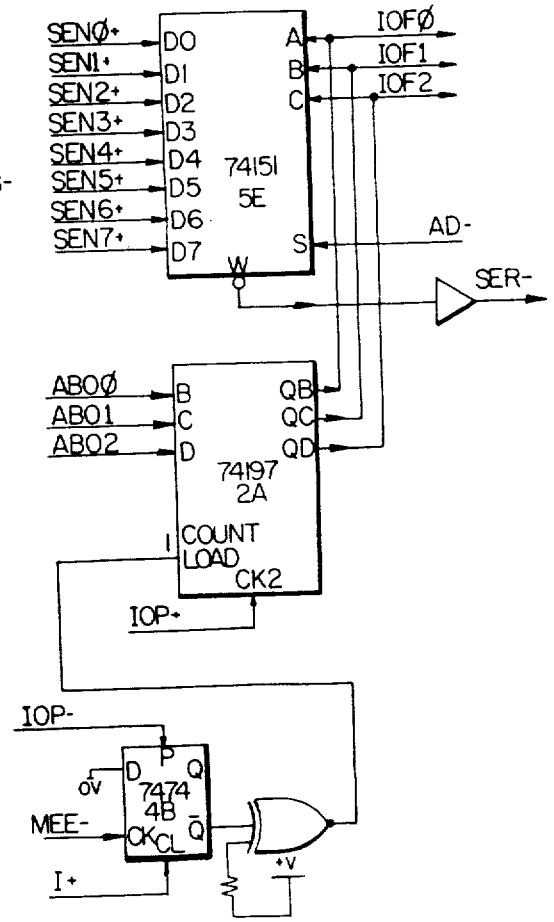

The computer communicates with the timer interface unit by placing a "device address" on lines ABO3–ABO7 (FIG. 9E) and a "function code" on lines ABO0–AB02 (FIG. 9G). If the computer is outputting data to the timer interface, signal OUT is produced; if the computer is inputting data, signal IN is produced.

Figure 9E:
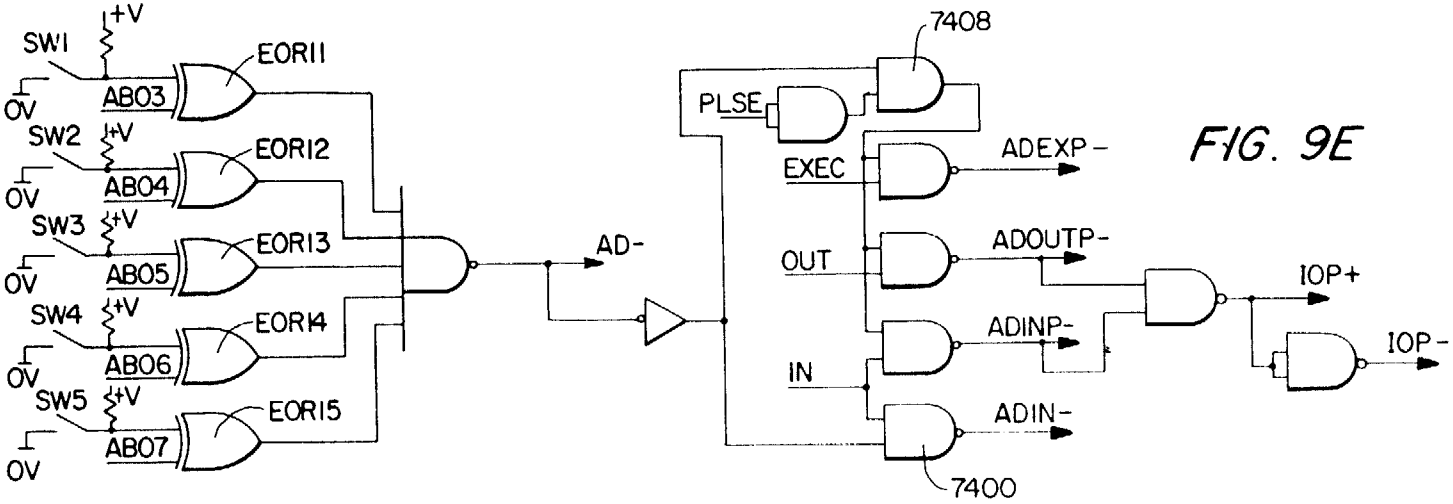

FIG. 9E shows exclusive OR gates EOR11–EOR15 which decode the "device address." A "device address" can also be selected manually by means of switches SW1–SW5, The address signal AD− from gate NAND3 is then further gated as indicated with computer-initiated signals IN, OUT, EXEC, and PLSE, to prevent the timer interface from responding to memory addresses which also appear on the address bus.

FIG. 9G shows a latch 2A which holds the function code of lines ABO0–ABO2 when either the IN or OUT signal is produced. The input/output function signals from latch 2A are labeled IOF0 through IOF2.

Figure 9F:
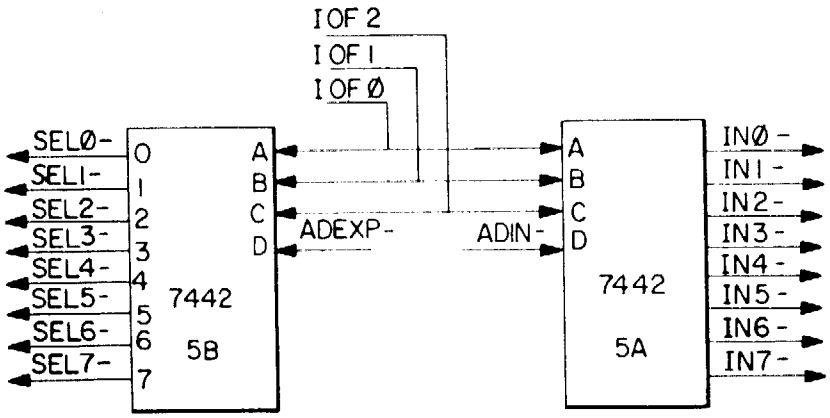

If the computer executes an IN instruction to receive data from the timer interface, the combination of IOF0 through IOF2 and ADIN− (FIG. 9E) produce one of signals IN0− through IN7− at BCD/decimal decoder 5A of FIG. 9F. Each of signals IN0− through IN7− enables data from one of up/down counters 1–8 to be placed on data bus terminals TBO0− through TB15−.

If the computer is executing a "select" instruction for the timer interface, the combination of signals IOF0−IOF2 and ADEXP− (FIG. 9E) produce one of select signals SEL0− through SEL7− at BCD/decimal decoder 5B of FIG. 9F. The select signal functions employed in the presently-described invention are:

SEL1− enables triggering of latch FF9 (FIG. 9D)

SEL2− resets up/down counter 8 (FIG. 9A)

SEL4− resets latch FF8 (FIG. 9D) and triggers monostable element 328 via NAND2 (FIG. 9C)

If the computer is executing a sense instruction from the timer interface, the combination of signals IOF0–IOF2 (FIG. 9G) and AD− (FIG. 9E) allow one of sense signals SEN0+ through SEN7+ to be placed on the SER-line (FIG. 9G). This allows the computer to examine the state of one of these sense signals. The only sense signal employed in the presently-described embodiment is SEN7+, which indicates that the timer interface has a complete set of time data for a single shot fired at the target as explained more fully below.

Figure 9H:
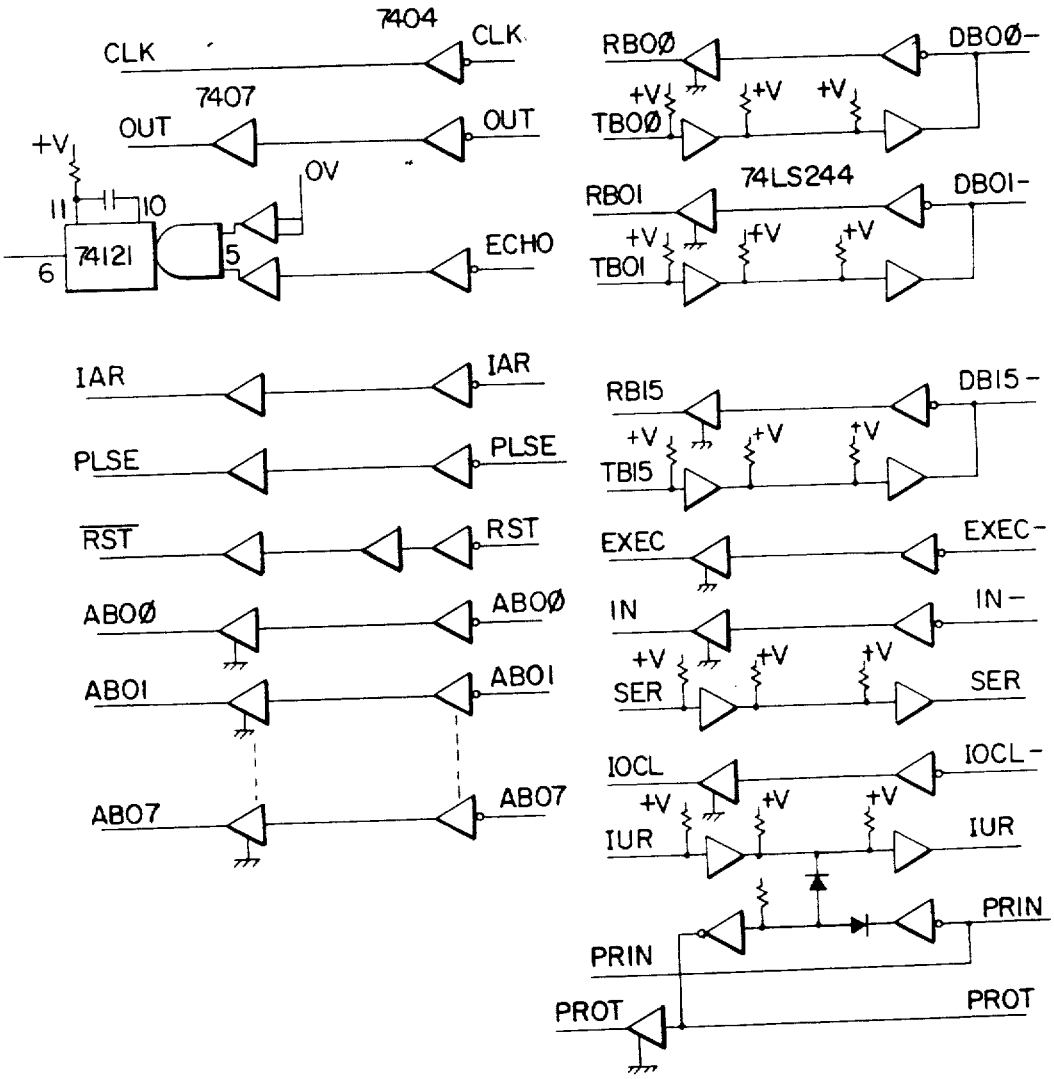

FIG. 9H shows buffer connections between the timer interface subsections of FIG. 9A–9G and the mini-computer buses.

The theory of operation of timer interface unit 64 is as follows. Channel Ch0 is the reference channel. Each channel triggering will clock a respective one of latches FF0–FF7, producing a respective one of signals LCH0+ through LCH7+. Signals LCH1+ through LCH7+ each control the up/down line of one of counters 1–7 and are also provided to OR gates EOR1 through EOR7 to produce a respective counter enabling signal ENA1− through ENA7−.

Exclusive OR gates EOR1 through EOR7 each achieve two functions. First, the counters of any channel that triggers before reference channel Ch0 will be enabled until reference channel Ch0 triggers. This has the effect of causing the counters to count down because the associated LCH+ input line is high. Second, the counters of any channels that have not triggered by the time reference channel Ch0 triggers are all enabled by the reference channel until each individual channel triggers. This has the effect of causing the counters to count up, since the associated LCH+ lines are low while the counters are enabled.

Initially, the computer resets up/down counter 8 with signal SEL2− and then causes a general reset with signal SEL4−. Signal SEL4− causes gate NAND2 (FIG. 9C) to trigger monostable element 328, producing clear signal CLR, which resets latches FF0–FF7 and up/down counters 1–7 (FIG. 9A). Reset signal SEL4− also clears latch FF8 (FIG. 9D). Latch FF9 (FIG. 9D) is preset by the computer with signal SEL 1−, which puts set steering onto FF9. Latch FF9 is thus clocked set when a signal VEL− is received at the "S.S." input from inertia switch isolator module 66, indicating that the target has been "hit".

Thus, prior to a shot being fired, counters 1–8 are reset, input latches FF0–FF7 are reset, and latch FF9 is "armed". All resets occur when the computer executes controller BASIC statement CALL (3), described further below.

At this stage, none of channels Ch0 through Ch7 or the "S.S." channel 8 has been triggered. Since channel Ch0 has not yet triggered, signal LCH0+ is low. The remaining input of gate EOR0 is permanently high, so the output of gate EOR0 is high. Since signals LCH1+ through LCH7+ are all low, signals ENA1− through ENA7− are all high, disabling all of up/down counters 1–7. Signal ENA8− is also high, disabling up/down counter 8.

Assume now that a shot is fired to the left of the target, missing the target, and to the left of the transducer array shown in FIG. 4. Channel 3 of FIG. 9A triggers first, so that signal LCH3+ goes high, causing signal ENA3− to go low and therby causing up/down counter 3 to begin counting down. Reference channel Ch0 and channel Ch1 then trigger simultaneously. Signal LCH0+ goes high, so the output of gate EOR0 goes low. This makes signal ENA3− go high, while signals ENA2− and ENA4− through ENA7− go low. Signals ENA1− and ENA8− remain high. Counter 3 will thus stop counting, counter 1 remains disabled and has no count, and counters 2, and 5–7 will start counting up.

As each successive channel triggers, its respective LCH+ signal will go high, removing the associated ENA− signal and stopping the associated counter. When all LCH+ signals are high (indicating that all counters have been disabled), signal SEN7+ at the output of gate NAND1 in FIG. 9A goes from high to low. The computer monitors signal SEN7+ to wait for all timing edge counts to be completed.

When the computer senses signal SEN7+, indicating that a complete set of counts is present in counters 1 through 7, it generates address signals, ABO0–ABO7 and the IN signal which cause BCD-to-decimal decoder 5A (FIG. 9F) to issue signals IN1− through IN7− in sequence so that the computer will sequentially "read" the state of each counter (on output lines TBO0− through TB15−) via the buffers of FIG. 9H.

The computer has thus received counts representing times as follows:

T1 zero count from counter 1 (transducer S1)

T2 positive count from counter 2 (transducer S2)

T3 negative count from counter 3 (transducer S3)

T4 negative count from counter 4 (transducer S3)

T5 positive count from counter 5 (air temperature sensing module as explained below with reference to FIG. 10, or, if none, the output of channel 6 amplifier 60 goes to input channel Ch5 of the timer interface unit and the output of transducer S4 triggers counter 5)

T6 positive count from counter 6 (transducer S4)

T7 positive count from counter 7 (inertia switch)

A2 zero count from counter 8 (inertia switch)

The zero count in A2 indicates that the inertia switch was not operated, thus showing that the shot fired has missed the target. Had the bullet struck the target, a non-zero count would be recorded in A2 because signal ENA8− would have gone low upon receipt of signal VEL− (FIG. 9D).

The computer is programmed to operate on the received "time" signals T1 through T7 and A2 in a manner which will be described below, such that the coordinates of the bullet trajectory in the X–Y measurement plane of FIG. 3 are determined.

If any channel of the timer interface unit triggers spuriously (i.e. the inertia switch may be triggered by a stone shower, one of the transducers may detect noise from other target lanes or other sources, etc.), the associated counter will continue counting until it overflows, causing a ripple carry signal (RC1− through RC7−). All of the ripple carry signals are supplied to gate NAND2 (FIG. 9C), which fires the associated monostable element 328, causing generation of clear signal CLR which resets latches FF0–FF7 and up/down counters 1–7.

The address, data, and timing buses in the LSI-2/20G minicomputer are entitled "Maxibus" by the manufacturer. Definitions of the Maxibus signals indicated at the right-hand side of FIG. 9H may be found in chapter 8 of the "LSI-2 Series Minicomputer Handbook," Part. No. 20400–0080, Apr. 1976, published by Computer Automation, Inc. All signals to and from the Maxibus and buffered between the microcomputer and timer interface unit 54, by the buffering circuits shown in FIG. 9H. Signals DB00−, DB01, and DB02− are bidirectional on the Maxibus and are converted to two unidirectional signals each in the buffering circuits of FIG. 9H. Signals "OUT" and "IN" both refer to the minicomputer.

The Maxibus signal destinations are related as follows to the Maxibus pin numbers:

| MAXIBUS SIGNAL | MAXIBUS PIN NUMBER |
|---|---|
| O volt | 1 |
| O volt | 2 |
| +5 volts | 13 |
| +5 volts | 14 |
| DBO0- | 39 |
| DBO1- | 40 |
| DBO2- | 41 |
| DBO3- | 42 |
| DBO4- | 45 |
| DBO5- | 46 |
| DBO6- | 47 |
| DBO7- | 48 |
| DBO8- | 49 |
| DBO9- | 50 |
| DB10- | 51 |
| DB11- | 52 |
| DB12- | 53 |
| DB13- | 54 |
| DB14- | 55 |
| DB15- | 56 |
| EXEC- | 57 |
| IN- | 58 |
| IOCL | 61 |
| OUT- | 62 |
| CLK | 63 |
| SER- | 64 |
| IUR- | 65 |
| IAR- | 67 |
| RST- | 69 |
| PLS- | 71 |
| ECHO- | 72 |
| ABO3- | 75 |
| ABO4- | 76 |
| ABO5- | 77 |
| ABO6- | 78 |
| ABO7- | 79 |
| ABO0- | 80 |
| ABO1- | 81 |
| ABO2- | 82 |
| PRIN- | 83 |
| PROT- | 84 |

Figure 10A:
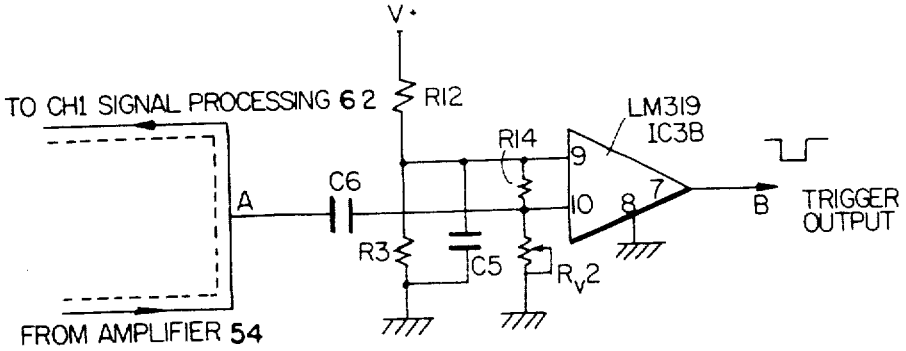
FIGS. 10A and 10B show a suitable circuit arrangement for the air temperature sensing unit 78 of FIG. 4.
Figure 10B:
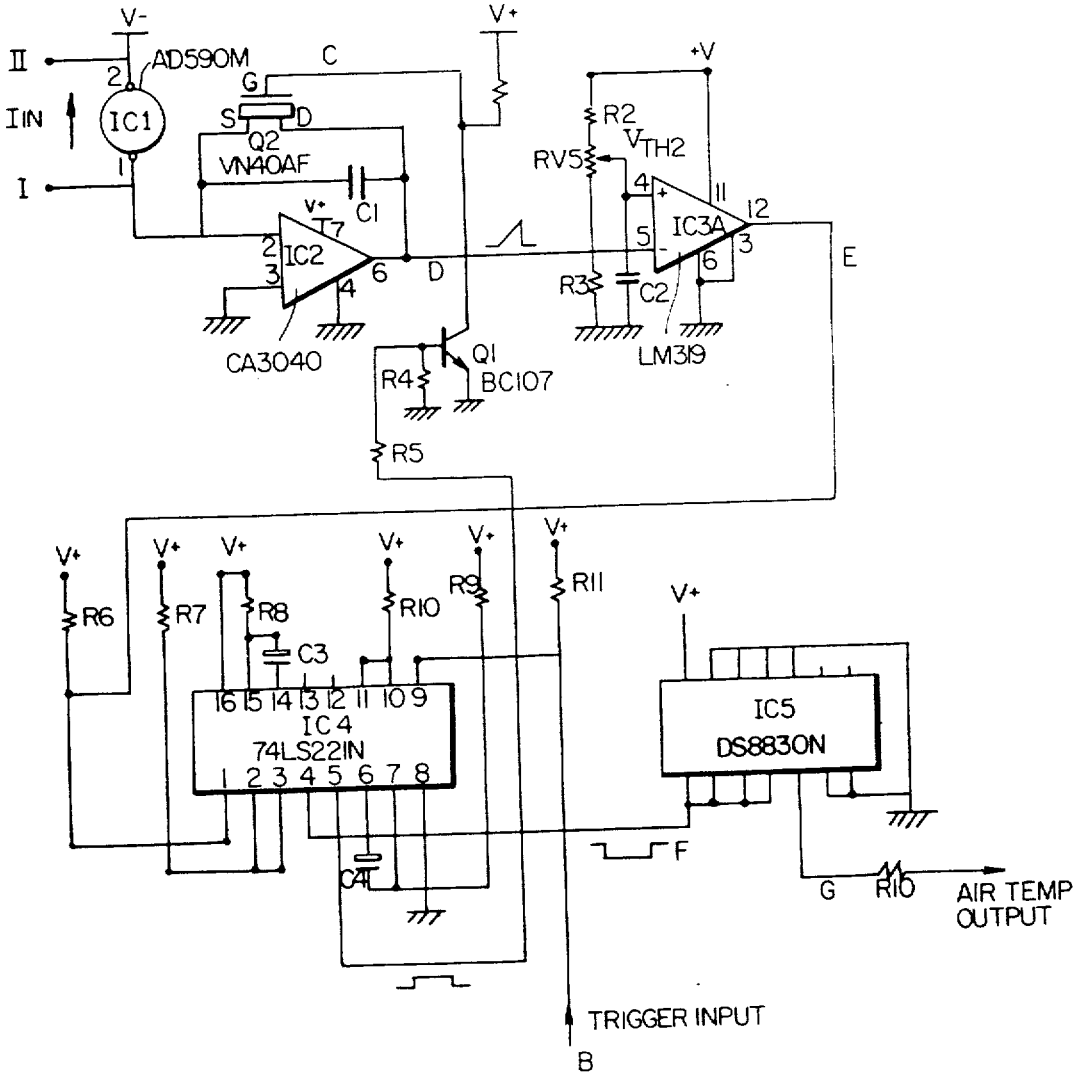

FIGS. 10A and 10B show in detail a suitable circuit arrangement for the air temperature sensing unit 78 of FIG. 4. FIG. 10C shows wave forms of various points in the circuit of FIGS. 10A and 10B. The effect of the air temperature sensing unit is to generate a pulse at a time $t_1$ following the time $t_o$ at which channel Ch1 of comparator unit 62 is triggered (allowing of course for propagation delays in connecting cables).

Referring to FIG. 10B, a temperature sensor IC1 mounted in a sensor assembly, which will be described below with reference to FIG. 10D, assumes a temperature substantially equal to that of ambient air in the vicinity of the transducer array. Temperature sensor IC1 may be, for example, Model AD590M, available from Analog Devices Inc., P.O. Box 280, Norwood, Mass. 02062. Temperature sensor IC1 permits a current $I_{IN}$ to flow through it, current $I_{IN}$ being substantially proportional to the absolute temperature (in degrees Kelvin) of the semiconductor chip which forms the active element of temperature sensor IC1.

Referring again to FIG. 10A, when transducer S1 detects a shock wave generated by the bullet, a wave form similar to that shown at A in FIG. 10C is produced at the output of its associated amplifier 54 (FIG. 4). Integrated circuit chip IC3B of FIG. 10A forms a threshold detector, the threshold being set equal to that set in channel CH1 of comparator unit 62 of FIG. 4 and 8. Integrated circuit chip IC3 may be of type LM 319, available from National Semiconductor Corporation, Box 2900, Santa Clara, Calif. 95051. When wave form A of FIG. 10C exceeds the preset threshold, wave form D is generated at the output of circuit chip IC3B. The leading edge (first transition) of wave form B triggers the monostable multivibrator formed by half of integrated circuit chip IC4 of FIG. 10B and the associated timing components R8 and C3. Circuit chip IC4 may be of type 74LS221N, available from Texas Instruments Inc., P.O. Box 5012, Dallas, Tex. 75222. The output of this monostable multivibrator is fed via buffer transistor Q1 to the gate of metal oxide semiconductor Q2, the wave form at this point being depicted as C in FIG. 10C. Transistor Q1 may be of type BC107, available from Mullard Ltd., Mullard House, Torrington Place, London, U.K., and semiconductor Q2 may be of type VN 40AF, available from Siliconix Inc., 2201 Laurelwood Road, Santa Clara, Calif. 95054. When wave form C, which is normally high, goes low, metal oxide semiconductor Q2 changes from a substantially low resistance between its source S and drain D to a very high resistance. As a result of the current flowing through temperature sensor IC1 (proportional to its absolute temperature), the voltage at the output of integrated circuit chip IC2 starts to rise, as shown at D in FIG. 10C. The rate of rise in volts per second of wave form D is substantially proportional to the current flowing through temperature sensor IC1 and thus is proportional to the absolute temperature of temperature sensor IC1. Integrated circuit chip IC2 may be of type CA 3040, available from RCA Solid State, Box 3200, Summerville, N.J. 08876. When the voltage of wave form D, which is supplied to the inverting input of comparator IC3A, rises to the preset threshold voltage VTH2 at the non-inverting input of comparator IC3A, the output of comparator IC3A changes state as indicated in wave form E at time $t_1$. This triggers a second monostable multivibrator formed of half of integrated circuit IC4 and timing components C4 and R9. The output of this second monostable multivibrator is sent via a line driver circuit chip IC5 to a coaxial cable which connects to the channel 5 input of the comparator unit 62.

The operation of the air temperature sensing unit 78 of FIGS. 10A and 10B may be mathematically described as follows (assuming that the ramp at wave form D of FIG. 10C is linear and ignoring offset voltages in the circuit, which will be small):

$$t_1 = \frac{V_{TH2}}{\frac{d}{dt} V_o} \tag{8}$$

where $V_o$=voltage of wave form D, FIG. 10C, and $$\frac{d}{dt} V_o = \frac{I_{IN}}{C_1} \tag{9}$$

where $I_{IN}$=current through IC1

$$I_{IN} = C\theta_K \tag{10}$$

where C is a constant of proportionality of $\theta_K$ is the absolute temperature of IC1 combining (8), (9) and (10), $$t_1 = \frac{V_{TH2}\,C1}{C\theta_K} \tag{11}$$

or $$\theta_K = \frac{V_{TH2}\,C1}{Ct_1} \tag{12}$$

Timer interface unit 64 can then measure timer $t_1$ by the same procedure that is employed for measuring the time differences between transducers S1–S4. It will be recalled that timer interface unit 64 will start counter 5 counting up upon receipt of a pulse on channel CH0, which is responsive to shock wave detection by transducer S1. Counter 5 will stop counting upon receipt of the pulse of wave form G from the air temperature sensing unit at time $t_1$. Thus, the count on counter 5 of the timer interface unit will be directly proportional to the reciprocal of the absolute temperature of sensor IC1.

Figure 10D:
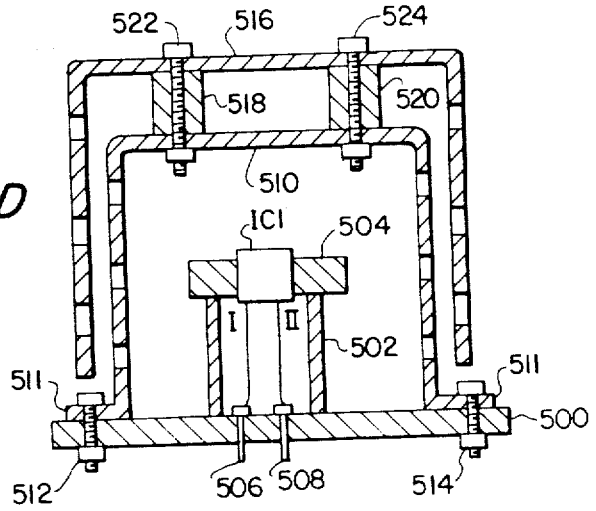
FIG. 10D shows a preferred mounting arrangement for the temperature sensor of FIG. 10B.
Figure 10C:
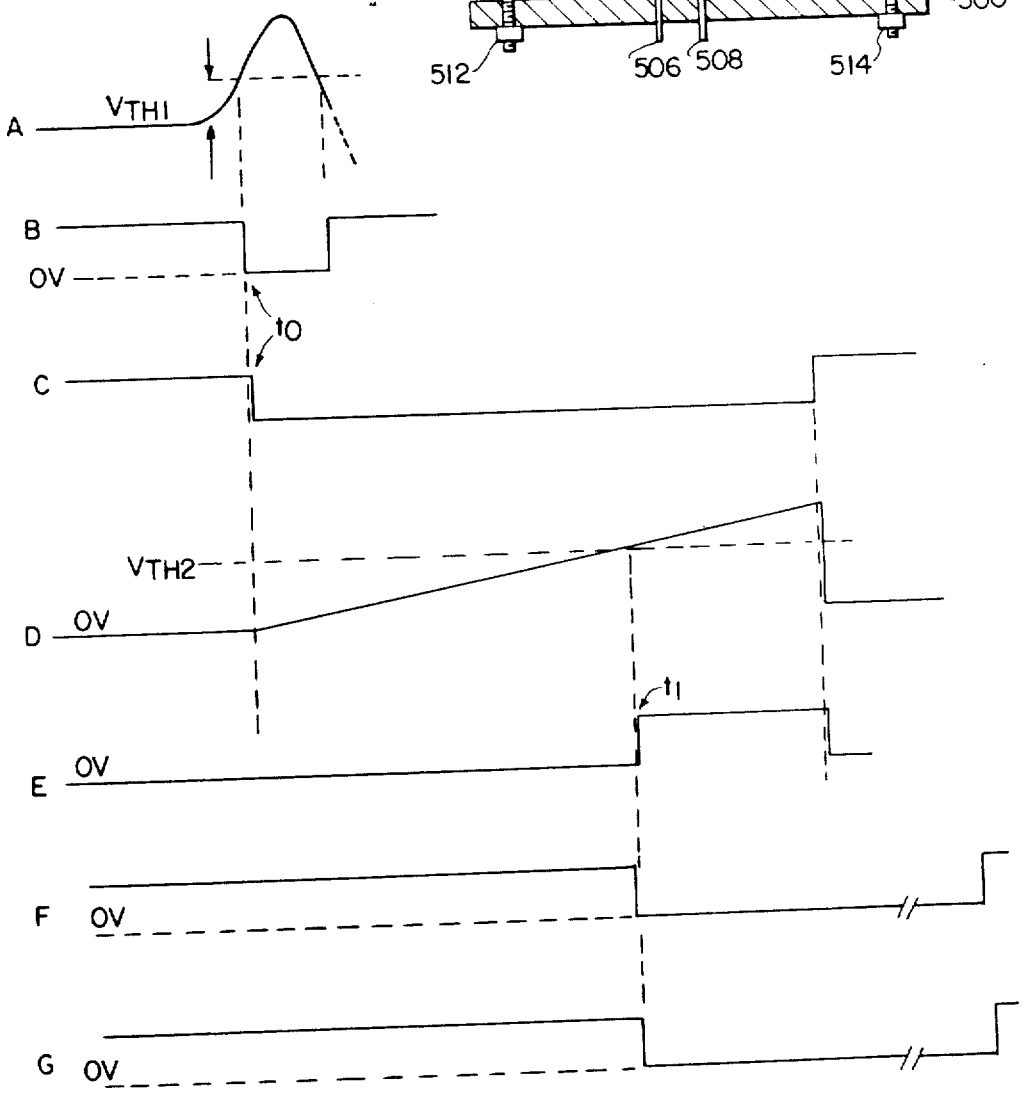
FIG. 10C shows a timing diagram for the circuits of FIGS. 10A and 10B.

A preferred mounting arrangement for temperature sensor IC1 is shown in the cross-sectional elevation view of FIG. 10D. The assembly has a base plate 500, formed from ⅛" thick glass-fiber printed circuit board material. Extending upwardly from base plate 500 is a standoff pillar 502, which is drilled longitudinally to permit passage of connecting wires from temperature sensor IC1. The standoff pillar 502 may be made of any suitable insulating material, such as Nylon, Mounted at the upper end of pillar 502 is a finned clip-on heat sink 504, such as Part No. 7200-01-01, Series 7200Q, available from Electrobits Proprietary Ltd., 43 Ivanhoe Street, Glen, Australia. Temperature sensor IC1 is then mounted in the heat sink with its leads I, II, connected to terminals 506, 508, respectively. Also mounted on the base plate 500 is an inner screen which consists of an inverted metal cup, with holes of approximately ¼ inch diameter drilled at spaced intervals through the sidewall. The metal cup may be, for example, of stainless steel of approximately ⅜ inch thickness. Inner screen 510 has a flange 511 fastened to base plate 500 by bolts 512, 514, or other suitable means. An outer screen 516 is provided around inner screen 510 for further shielding the temperature sensor IC1. Outer screen 516 also preferably consists of an inverted metal cup with holes of approximately ¼ inch diameter drilled at spaced intervals through the sidewall. The holes in the inner screen are located such that they are not directly opposite those in the outer screen, so as to prevent direct sunlight from heating the temperature sensor IC1 and to prevent wind blown rain water from striking the temperature sensor. Spacers 518, 520, and bolts 522, 524 (or other suitable means) retain the outer screen 516 in the position indicated relative to the smaller-diameter inner screen 510.

Figure 11:
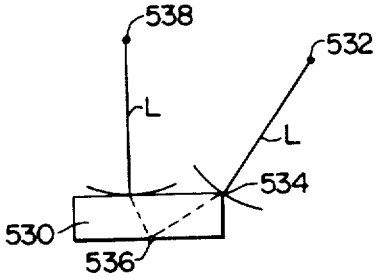
FIG. 11 shows airborne shock waves impinging on a piezoelectric disc transducer.
Figure 12:
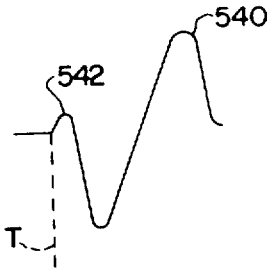
FIG. 12 shows an output waveform of the transducer of FIG. 11.

In practicing the present invention, it is preferred to utilize for each of transducers S1–S4 a flat disk 530 of piezoelectric material, as illustrated in FIG. 11. Such a transducer does have several disadvantages, however. If a bullet 532 is fired to the right of the transducer 530, the subsequent shock wave front 532 will impinge on the edge of corner 534 of transducer 530, and the transducer will be compressed both in a vertical direction and in a horizontal direction. The resultant transducer output will have a wave form substantially as illustrated in FIG. 12, which is a negative-going sinusoidal wave form 540 having a small positive "pip" 542 at the leading edge thereof. It is desired to measure the time T illustrated in FIG. 12 and it is very difficult to detect this time "T" accurately since the amplitude of the "pip" 542 depends upon the precise position of the bullet relative to the transducer, is difficult to distinguish from background noise and can even be absent under some circumstances.

The minicomputer is provided in advance with information concerning the position of each of transducers S1–S4, this information being the precise center 536 of transducer disc 530. All calculations are performed based on the assumption that the transducer is located at point 536 and that the output signal generated by the transducer is indicative of the instant at which the shock wave arrives at point 536. However, the transducer 530 provides an output with a predetermined response time as soon as it is impinged by the shock wave. If a bullet 538 passes vertically above transducer 530, the shock wave therefrom impinges directly on the upper surface of the transducer, generating an output signal. It can be seen that the trajectory of bullet 532 fired to the right of the transducer is further from point 536 than trajectory of bullet 538 passing immediately over the transducer.

However, the distance between the transducer surface and each of the trajectories of the bullets 532, 538 is equal to a distance L. Since the transducer provides an output as soon as the shock wave impinges thereon, the times between the bullet passing and the output signal being generated are equal. Therefore, the output of the transducer would suggest that the trajectories of the bullets 532, 538 are equispaced from point 536, which is not correct. That is, a slight timing error will be generated and the calculated trajectory of the bullet passing to the right of the transducer will be closer to point 536 than it is in reality.

This disadvantage can be overcome by disposing the transducers in a vertical orientation so that the transducers are in the form of vertical disks with the planar faces of the disks directed toward the marksman. As a bullet passes over the disks and the resulting shock wave is generated, the shock wave will always impinge on the periphery of each disk and the point of impingement of the shock wave on each disk will be an equal distance from the center or origin of the disk. A constant timing error will thus be introduced into each signal generated by each transducer. Since only time differences are used as a basis for calculation of the bullet trajectory location, this constant error will be cancelled out.

However, orienting the disks in a vertical position will not obviate the problem of the positive pip 542 at the beginning of output signal 540 as shown in FIG. 12. Therefore, in the present invention it is preferred to provide each transducer with a dome of a solid material having a convex surface exposed to the shock wave, the planar base of the dome being in contact with the transducer disk and being suitable for transmitting shock waves from the atmosphere to the transducer disk. If a hemispherical dome is utilized (provided that the axis of the dome is positioned vertically upwardly in front of the target or is directed toward the marksman or is at an orientation between these two limiting orientations), the shock waves generated by the projectiles fired at the target will always strike the periphery of the hemispherical dome tangentially, and shock waves will be transmitted radially through the dome directly to the center of the transducer. A constant timing error is thereby introduced, the timing error being equal to the time taken for the shock wave to pass from the periphery of the hemispherical dome to the center thereof and, as indicated above, such a constant timing error will be of no consequence in the calculation of the bullet trajectory location.

The hemispherical dome serves to prevent or minimize the generation of the positive-going pip 542 at the beginning of the transducer output wave form, so the output of the transducer more closely resembles a sinusoidal wave form. It is important that the instant of commencement of this sinusoidal wave form be measured with great accuracy, and thus it is preferred to utilize a transducer that will have a very fast response, though not necessarily a large response.

It has been found that if the response time of a series of piezoelectric disks of different size are compared, the response time is a function of the diameter of the disk, the smaller disks having a faster response time. However it has been found that a response time of all disks with 5 mm diameter or smaller are substantially equal. It is to be noted, however, that the amplitude of the disk output is proportional to its size. For this reason, it is advantageous to utilize a disk having a diameter of about 5 mm, since such a size provides the fastest response time with the highest amplitude output signal.

Figure 13:
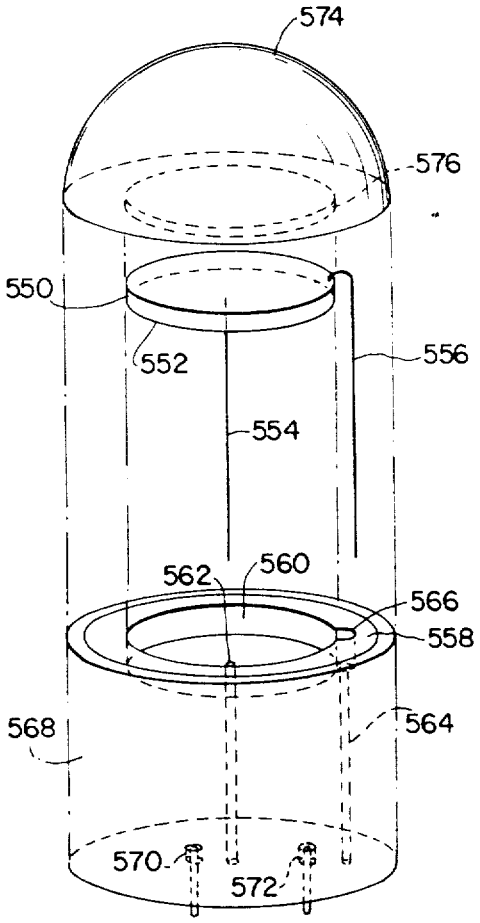
FIGS. 13 and 14 show one possible form of construction for airborne shock wave-sensing transducers.
Figure 14:
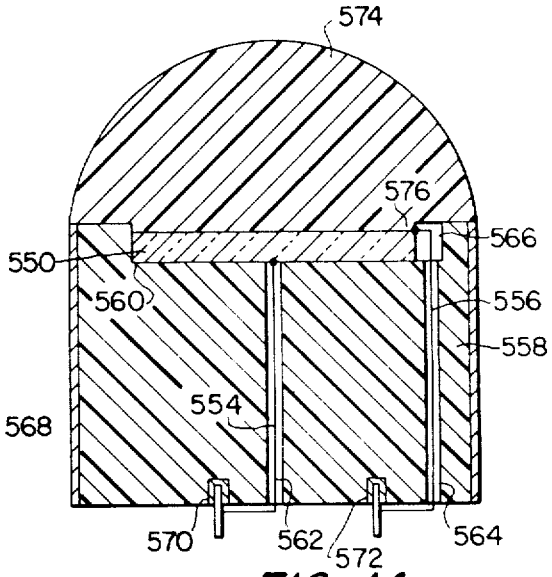

Referring now to FIGS. 13 and 14 of the drawings, one possible form of transducer for use in connection with the present invention comprises a transducer element consisting of a disk 550 of piezoelectric material such as, for example, lead zirconium titanate. The disk 550 is about 1 mm thick and 2–5 mm in diameter, and may be part No. MB1043, available from Mullard Ltd., Torrington Place, London, U.K. The opposed planar faces of disk 550 are provided with a coating of conductive material 552, which may be vacuum-deposited silver.

Two electrically conductive wires 554, 556 of, for example, copper or gold, are connected to the center of the lower surface of the disk and to the periphery of the upper surface of the disk, respectively, by soldering or by ultrasonic bonding. Disk 550 is then firmly mounted in a housing which comprises a cylindrical member 558 having recess 560 in one end thereof, the recess 560 having a depth of about 1.5 mm and a diameter adapted to the transducer disk diameter, and being aligned with an axial bore 562 extending through member 558 to accomodate wire 554 provided on the lower surface of the piezoelectric member. A second bore 554, parallel to bore 562, is formed in the periphery of member 558, bore 562 accomodating wire 556 and terminating in an open recess 566 adjacent the main recess 560. Member 558 may be formed of Tufnol, which is a phenolic resin bonded fabric, this material being readily obtainable in cylindrical form. The housing may be machined from this material, although the housing may be alternately formed of a two-part phenolic resin such as that sold under the trademark Araldite, the resin being retained in a cylindrical aluminum case 568 and subsequently being machined. If the latter construction is employed, aluminum case 568 may be grounded to provide a Faraday cage to minimize noise. The piezoelectric material and wires are bonded into member 560 with an adhesive such as Araldite or a cyano-acrylic impact adhesive. Two small bores 570, 572 are provided in the lower surface of member 558 and electrically conducting pins are mounted in the bores. Wires 554, 556 protrude from the lower ends of bores 562, 564 and are soldered to the pins in bores 570, 572, respectively. An adhesive or other suitable setting material is employed to retain all the elements in position and to secure a solid hemispherical dome 574 to the transducer element 550. The dome 574 may be machined from aluminum or cast from a setting resin material such as that sold under the trademark Araldite. The dome 574 preferably has an outer diameter of about 8 mm, which is equal to the diameter of the housing 568. A centrally-disposed projection 576 on the base of the dome member 574 contacts and has the same diameter as the piezoelectric disk 550. Alternatively, dome 574 and member 558 may be cast as a single integral unit surrounding the transducer disk.

The assembled transducer with housing as shown in FIG. 14 is mounted, as discussed elsewhere herein, in front of the target. It is important that both the housing and a coaxial cable coupling the transducer assembly to the associated amplifier be acoustically decoupled from any support or other rigid structure which could possibly receive the shock wave detected by the transducer before the shock wave is received by the hemispherical dome provided on top of the transducer. Thus, if the transducers are mounted on a rigid horizontal framework, it is important that the transducers be acoustically decoupled from such framework. The transducers may be mounted on a block of any suitable acoustic decoupling medium, such as an expanded polymer foam, or a combination of polymer foam and metal plate. A preferred material is closed-cell foam polyethylene, this material being sold under the tradename Plastizote by Bakelite Xylonite, Ltd., U.K. Other suitable acoustic decoupling materials may be used, as well, such as glass fiber cloth, or mineral wood.

Figure 15:
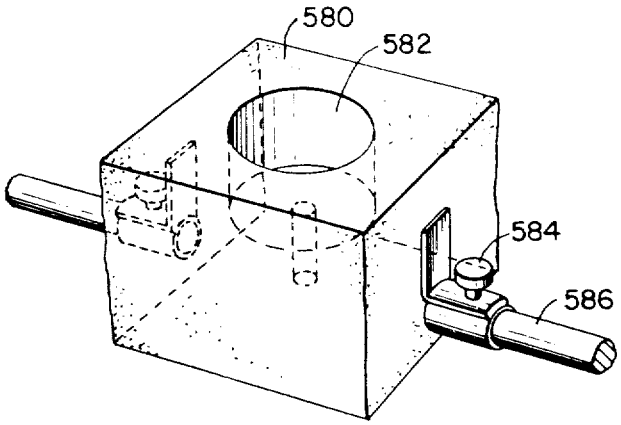
FIG. 15 shows an acoustically decoupled mounting for the airborne shock wave sensing transducers.

The transducer may be mounted by taking a block 580 of acoustic decoupling medium as shown in FIG. 15, and forming a recess 582 within the block of material for accomodating the transducer assembly of FIG. 14. The entire block may be clamped in any convenient way, such as by clamps 584, to a suitable framework or support member 586, these items being illustrated schematically. Other suitable mounting arrangements for the transducer assembly will be described later below.

To summarize briefly, the system described above includes:

Transducers S1, S3, S4 for detecting shock wave arrival times along a line parallel to the measurement plane, which is in turn substantially parallel to the target.

Transducers S1, S2 for detecting shock wave arrival times along a line perpendicular to the measurement plane and substantially parallel to the bullet trajectory.

An inertia switch mounted on the target for detecting actual impact of the bullet with the target.

A unit for detecting the ambient air temperature in the region of the transducer array. The outputs of the transducers, inertia switch, and air temperature sensing unit are fed through circuitry as described above to the timer interface unit, which gives counts representing times of shock wave arrival at the transducers, representing the inertia switch trigger time, from the timer interface unit to the minicomputer. Provided that the minicomputer is supplied with the locations of the transducers relative to the measurement plane, it may be programmed to:

Determine the speed of sound in ambient air in the vicinity of the transducer array (to a reasonable approximation) by a known formula $$V_{ST} = V_{S0^\circ C}\sqrt{\frac{T^{\circ}K}{273}} + 0.09 \quad (13)$$

where $V_{ST}$ is the speed of sound in air at the given temperature T, and $V_{S0^\circ C}$ is the speed of sound at zero degrees Celsius.

Determine the velocity of the bullet in the direction perpendicular to the measurement plane and substantially parallel to the bullet trajectory, and Determine the location of the trajectory in the measurement plane.

However, the information provided from the timer interface unit permits still further and very advantageous features to be provided in the system for marksmanship training. The system can be made to discriminate between direct (free flight) target hits by the bullet, on the one hand, and target hits from ricochets or target hits from stones kicked up by the bullets striking the ground or spurious inertia switch triggering due to wind or other factors, on the other hand. In the embodiment employing timer interface unit 64, spurious inertia switch triggering will cause counter 7 to count until ripple carry signal RC7− is produced, thereby causing the system to automatically reset. The system can be further made to discriminate between ricochet hits on the target and ricochet misses. These features further enhance the usefulness in training as the as the marksman can be apprised, immediately after a shot is fired, of the location of the shot relative the target in the measurement plane, whether the target was actually hit by the bullet, whether the shot ricocheted, and even of a "score" for the shot.

The present invention contemplates three possible techniques for processing the information from the timer interface unit for the purpose of providing ricochet and stone hit discrimination.

(a) Electronic target window. For a hit to be genuine, the hit position determination system should have recognized a projectile as having passed through a target "window" in the measurement plane approximately corresponding to the outline of the actual target being fired upon. The target outline is stored in the computer and is compared with the location of the projectile as determined from the transducer outputs. If the calculated projectile trajectory location is outside the "window," then the "hit" reported by the inertia switch or other hit registration device cannot be valid and it can be assumed that no actual impact of the bullet on the target has occurred.

(b) Projectile velocity. It has been found experimentally that, although there is a variation in velocity of bullets from round to round, any given type of ammunition yields projectile velocities which lie within a relatively narrow band, typically + or −5%. It has also been found that when a projectile ricochets, its apparent velocity component as measured by two in-line sensors along its original line of flight is substantially reduced, typically by 40% or more. It is therefore possible to distinguish a genuine direct hit from a ricochet by comparing the measured velocity component with a preset lower limit representing an expected projectile velocity (which will generally be different for different ammunitions and ranges). If the detected projectile velocity does not exceed this threshold limit, then the associated mechanical hit registration (inertia switch) cannot be valid and can be ignored. The computer may be supplied with a minimum valid threshold velocity for the type of ammunition being used, and the appropriate comparison made. It is to be noted that this technique does not require a capability to measure position, but only projectile velocity, and can be implemented using only an impact detector in combination with two sensors positioned relative to the target for detecting the airborne shock wave generated by the projectile at two spaced locations on its trajectory.

(c) Hit registration time. For a "hit" detected by the inertia switch to be genuine, it must have occurred within a short time period relative to the time at which the projectile position determining system detected the projectile. It has been found from theory and practice that this period is very short, not more than + or −3.5 milliseconds for a commonlyused "standing man" target as illustrated in FIG. 2. By suppressing all target impacts detected by the inertia switch outside of this time, many otherwise false target impact detections are eliminated. The position in time and the duration of the period varies with different targets, with position of hit positions sensors (i.e. airborne shock wave responsive transducers) relative to the target, with nominal projectile velocity and velocity of sound in air, and, to a small extent, with various target materials. All these factors are, however, known in advance and it is therefore possible to provide the system with predetermined limits for the time period. It is to be noted that this last technique does not require a capability to measure position or even projectile velocity, and can be implemented using only an impact detector in combination with a single sensor positioned relative to the target for detecting the airborne shock wave generated by the projectile.

A suitable program written in "BASIC" programming language which may be directly used with the Computer Automation LSI 2/206 minicomputer appears as Appendix A in U.S. Pat. No. 4,307,292 (hereinafter referred to as Appendix) and is incorporated herein by reference. An explanation of the various functions of that program, appearing in said patent, is also hereby incorporated herein.

A further program, in the "BASIC" programming language, similar to that of in Appendix A appears as Appendix B in U.S. Pat. No. 4,307,292 (hereinafter referred to as Appendix B). It too is hereby incorporated by reference herein. However, the program of Appendix B is intended for use with the LSI-2/20G minicomputer where no air temperature sensing unit 78 (FIG. 4) is employed. In this case, the Ch5 and Ch 6 inputs of the timer interface unit 64 are patched together for receiving the output of comparator unit channel Ch6 in parallel. The computer operator is provided with an opportunity (Appendix B, at lines 1045–1050) to read the ambient air temperature in the vicinity of the transducer array from a remotereading thermometer 76 (FIG. 4), and supply the value manually via the keyboard of unit 72. Except for this variation, the program of Appendix B compares with that of Appendix A.

It will be recognized from the foregoing that the computer programs of Appendix A and Appendix B employ the "projectile velocity" and "hit registration time period" techniques for ricochet and stone hit discrimination. Those skilled in the art will readily recognize the manner in which the programs of Appendix A and Appendix B may be modified to employ the "electronic target window" technique for ricochet and stone hit discrimination. That is, a mathematical algorithm defining the boundaries of the target outline in the measurement plane may be included in the program and compared with the X, Y coordinates of the calculated bullet trajectory location in the measurement plane to determine whether the calculated location lies within the target "window". Assuming for example that the target is a simple rectangle, the "window" may be defined in the program as $XA<X1<XB$, $YA<Y1<YB$, where XA and XB represent the left and right edges of the target "window" and YA and YB represent the lower and upper edges of the target "window", respectively.

The "BASIC" subroutines "CALL(3)" and "CALL(4,- - -)" will now be described in greater detail to enable those skilled in the art to fully understand the operation of the program of Appendices A and B.

Subroutines CALL (3) and CALL (4, - - - -) are Assembly Language subroutines utilized to interface the timer interface unit 64 with the Controller BASIC of Appendices A and B. "Controller BASIC" is a version of the high-level computer language "BASIC" available from Computer Automation Inc. for use in the LSI-2 minicomputer. Controller BASIC has the facility of linking user written subroutines to BASIC for the control of non-standard input or output devices. "Assembly Language" is employed for programs which convert pseudo-English programming statements to binary instructions which can be executed on the Computer Automation LSI-2 minicomputer. The features of "BASIC" are described in sections 1–7 of Computer Automation BASIC Reference Manual No. 90-96500-01E2. Appendix A of that manual describes linking of Assembly Language subroutines to BASIC, while Appendix E describes the component software modules incorporated in Controller BASIC. Computer Automation Assembler Reference Manual No. 90-96552-00A1 describes all features of the Computer Automation Assembly Language facility known as MACRO2. Computer Automation Real Time Executive Users Manual No. 90-94500-00F2 describes all features of the real time executive program which is required for running controller BASIC on the LSI2 minicomputer.

Two Assembly Language subroutine facilities are provided in the programming described above. They are:

CALL(3): Execution of this BASIC statement resets the timer interface unit 64 and readies the circuitry for use. This subroutine is assigned the Assembly Language label RESET.

CALL(4 Z0, A2, T7, T6, T5, T4, T3, T2, T1): Execution of this BASIC statement transfers the binary numbers of counters 1–8 of the timer interface unit to BASIC in sequence. This subroutine is assigned the assembly language label IN:HIT in the Controller BASIC Event Handler Subroutine Module.

Figure 16A:
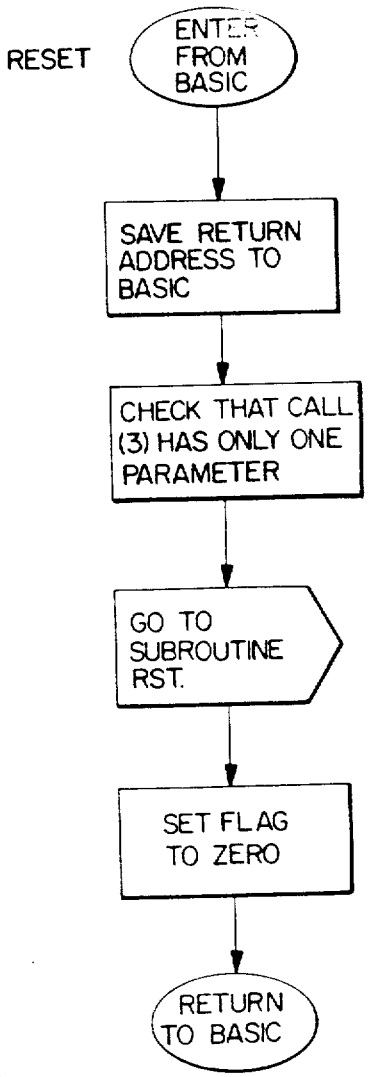
FIGS. 16A and 16B are flow charts for computer subroutine CALL(3)
Figure 16B:
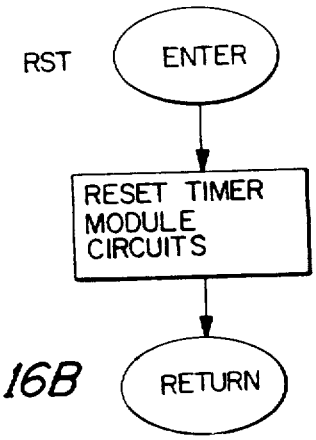

FIGS. 16A and 16B show flow chart sections for the subroutine RESET. Appendix C of U.S. Pat. No. 4,307,292 incorporated herein by reference and hereinafter referred to as Appendix C provides a program listing for this subroutine. The subroutine RESET starts on line 40 of the listing of Appendix C. It saves the return address to BASIC and then tests that CALL(3) has only one parameter. Another subroutine labeled RST (line 31) is then called which contains the instructions to reset the timer interface unit circuits. Subroutine RESET ends by returning to BASIC.

Figure 17A:
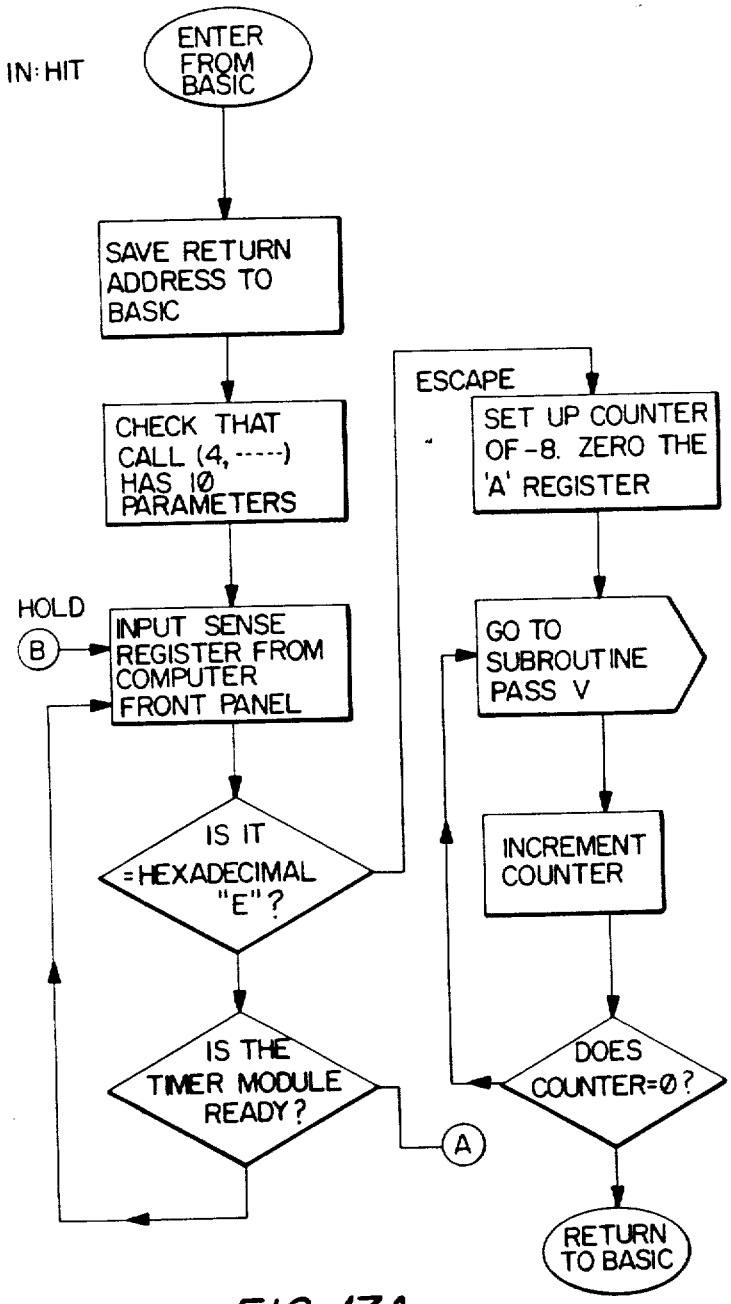
FIGS. 17A–17C show flow charts for computer subroutine CALL(4)
Figure 17B:
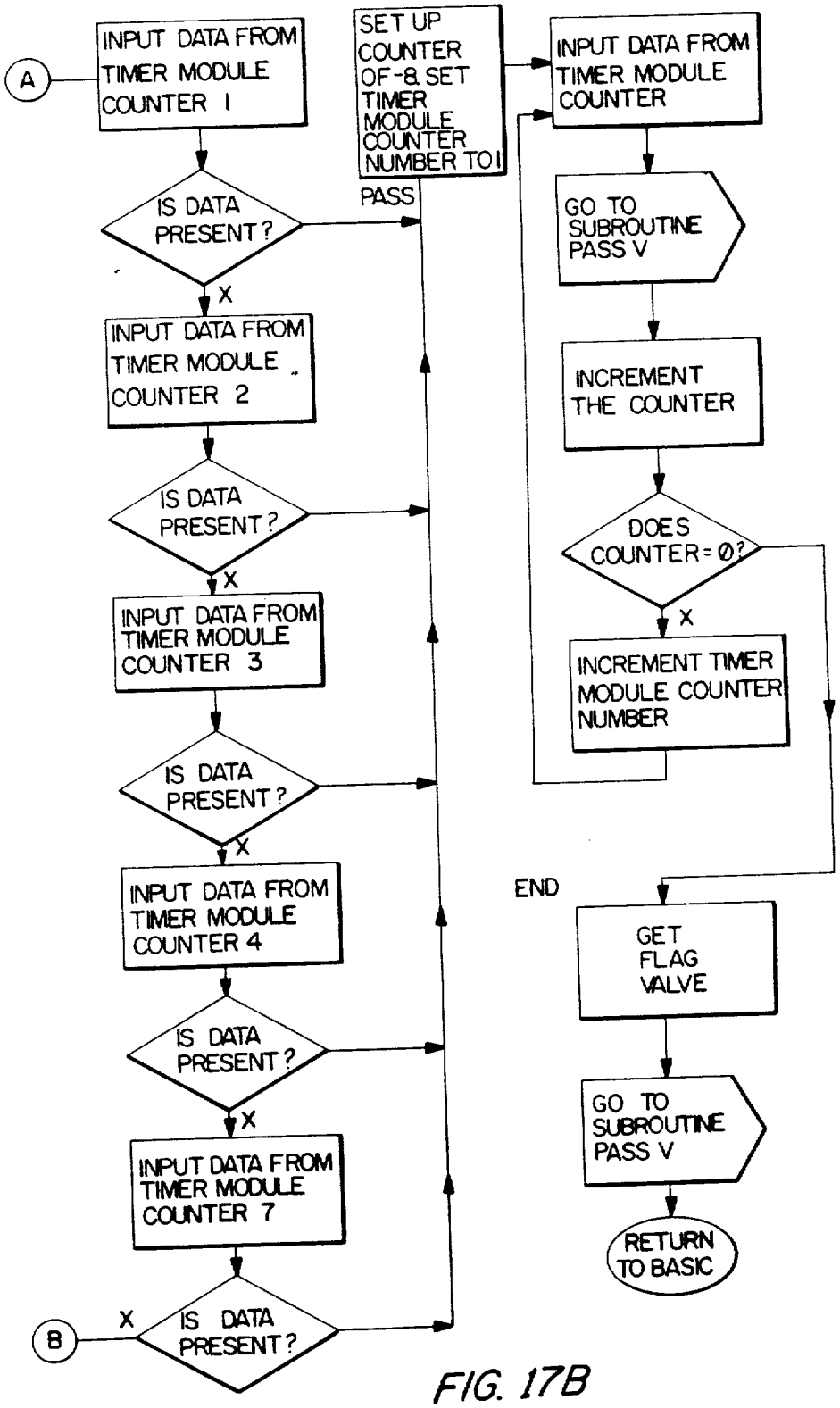
Figure 17C:
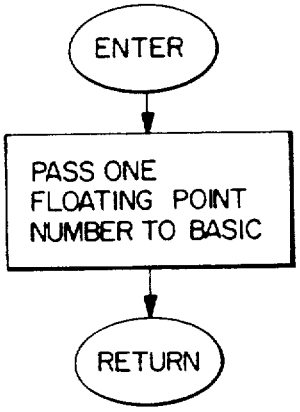

FIGS. 17A, 17B, and 17C provide a flow chart for the subroutine IN:HIT, while Appendix C contains a program listing for this subroutine. Subroutine IN:HIT commences on line 48 of the listing in Appendix C by saving the return address to BASIC, and then checks that CALL(4, - - - - - - - - -) has ten parameters, i.e., it verifies the format of the statement. On line 52 of Appendix C, the program labeled HOLD checks whether the computer operator has pressed the "E" key on the LSI-2 minicomputer front panel. This is a feature to allow the operator to escape from the subroutine back to BASIC if the timer interface unit fails to operate for any reason. If the "E" key has been pressed, the program labeled ESCAPE (line 58) passes eight zero values and one flag to BASIC using the subroutine PASSV which will be described later. If the "E" key has not been pressed, the program checks whether the timer interface unit has been triggered and is ready to input data to the computer. If the timer interface unit is not ready, control passes back to HOLD and the loop is executed indefinitely until either the timing module becomes ready or the operator presses the "E" key. When the module becomes ready, the program labeled P:NEXT (line 84) checks that a counter is fitted in one of positions 1, 2, 3, 4, or 7 by inputting data from each in turn. If data is not present from one counter, this is a false condition and the program returns to HOLD. When data is found, the program proceeds to PASS (line 70 of Appendix C), which inputs data from each of the eight timing module counters in turn and passes it back to BASIC. Finally, the program labeled END (line 64 of Appendix C) passes a flag value to the ninth BASIC variable Z0 control passes back to BASIC on line 66 (the flag value is not used in the embodiments described herein). The subroutine PASSV (line 98 of Appendix C) is used to pass all valuesin Appendix A of the Computer Automation BASIC Reference Manual.

Figure 18:
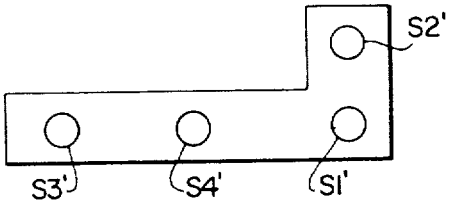
FIGS. 18–20 show alternate transducer arrangements in plan view.
Figure 19:
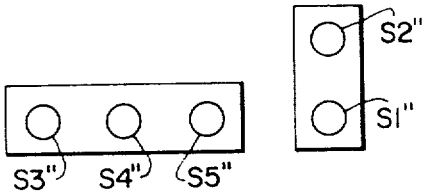

Those skilled in the art will recognize that the configuration of the transducer array in FIGS. 2 and 4 may be modified within the spirit and scope of the present invention. For example, FIG. 18 shows an array in which transducers S1', S3', and S4' are spaced along a line parallel to the measurement plane, with transducers S2' spaced apart from transducer S1' along a line normal to the measurement plane. Thus, the transducer array, when viewed in plan, has an "L" shaped configuration rather than the "T" shaped configuration of FIGS. 2 and 4. Alternatively, the arrangement of FIG. 19 could be employed in which an array of transducers S3"–S5" is spaced apart along a line parallel to the measurement plane, with transducers S1" and S2" spaced apart along a line normal to the measurement plane. The transducers may thus be configured in two separate arrays, and transducer S1" need not be in line with transducers S3"–S5".

Figure 20:
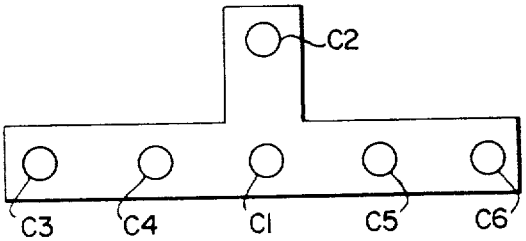

Still a further arrangement of transducers may be employed as shown in FIG. 20. In that configuration, transducers C1 and C3–C6 are in a line parallel to the measurement plane, and transducers C1 and C2 are spaced along a line normal to the measurement plane. With the arrangement of FIG. 20, the diagram of FIG. 4 would be modified so that the output of transducer C1 is coupled to timer interface unit input channels Ch0 and Ch1, the outputs of transducers Ch2–Ch6 are coupled to the inputs Ch2–Ch6 of the timer interface unit, respectively, and the air temperature sensing unit and isolator module outputs are coupled to the channel Ch7 and S.S. inputs of the timer interface unit. Minicomputer 70 is then programmed in accordance with the program listing given in Appendix D of U.S. Pat. No. 4,307,292, herein incorporated by reference herein and hereinafter referred to as Appendix D, which includes provision for detecting ricochets and which further provides an indication of which quadrant of a target is impinged by a projectile detected by the apparatus of the invention (i.e. employing a version of the target "window" technique described above). The program of Appendix D is in the "BASIC" programming language and includes comments which describe the function of the various lines in the program listing.

Figure 21:
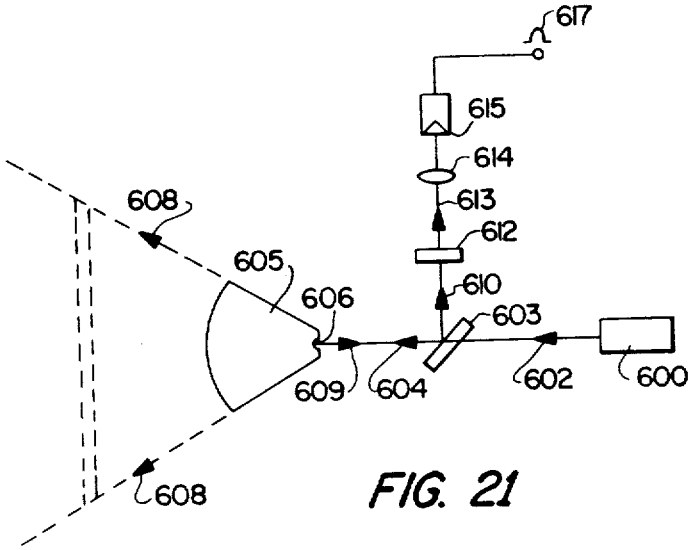
FIG. 21 shows apparatus for generating a light curtain and detecting the passage of a projectile therethrough.

Still further modifications may be made in accordance with the present invention, as will be recognized by those skilled in the art. For example, one or more light curtains may be generated for detecting passage of the bullet through an area in space, for the purpose of determining the velocity of the bullet. Such apparatus may be of the type disclosed in U.S. Pat. No. 3,788,748 to KNIGHT et al., the content of which is incorporated herein by reference. FIG. 21 shows an apparatus for generating a light curtain and detecting the passage of the bullet therethrough. A continuous wave helium-neon laser 600 generates a beam 602 which is directed onto an inclined quartz mirror 603 having a mirror coating on the second surface thereof, relative to beam 602, such that a portion of beam 602 is transmitted therethrough to form beam 604. Beam 604 is passed into a lens 605. Lens 605 is shaped as a segment of a circle cut from a sheet of material sold under the trade name Perspex. Beam 604 is directed to bisect the angle of the segment and passes centrally thereinto at a circular cut-out portion 606. Cut-out portion 606 causes beam 604 to project as beam 608, which is of substantially rectangular cross-section shown by the dotted lines and which has no substantial transverse divergence.

Lens 605 comprises a generally triangular slab of light transmitting material having two substantially straight edges which converge, and having a part in the form of a part cylindrical notch 606 adjacent to the apex confined by the converging edges, which is adapted to diverge light entering the lens at the apex. The two straight edges of the lens, not being the edge opposite the apex at which light is to enter the lens, are reflective to light within the lens. For example, the edges may be mirrored. Such a lens is adapted to produce a fan-shaped beam of light (a light curtain) having an angle which is equal to the angle included by the edges of the slab adjacent the apex at which light is to enter the slab.

If a projectile such as a bullet should pass through beam 608, it will be incided by beam 608. Since the projectile cannot be a perfect black body, a portion of the beam will be reflected thereby, and a portion of that reflection will return to lens 605 where it will be collected and directed at mirror 603 as beam 609. Beam 609 is reflected by mirror 603, which is first-surface coated, with respect to beam 609, as beam 610. The coating of mirror 603 is such that beam 610 will be approximately 50% of beam 609. Beam 610 passes through an optical band pass filter 612 which prevents light of frequency substantially different to that of laser 601 from passing, so as to reduce errors which may arise from stray light such as sunlight. Beam 610 emerges as beam 613, which then passes through lens 614. Lens 614 focuses beam 613 onto to the center of a photoelectric cell 615, which emits an electrical signal 617. Signal 617 thus indicates the time at which the projectile passed through the light curtain.

Figure 22:
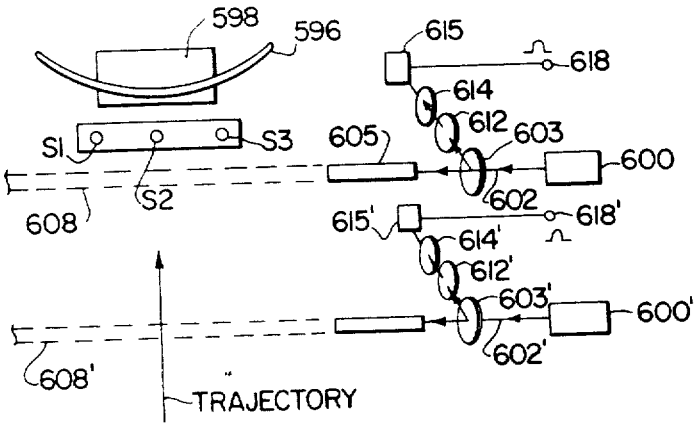
FIG. 22 shows an arrangement employing two such construction as shown in FIG. 21, in combination with an array of transducers for detecting an airborne shock wave.

FIG. 22 shows schematically a system according to the invention which may be employed for determining the velocity of the bullet in a direction normal to the measurement plane and the location in the measurement plane. A target 596 is mounted on a target mechanism 598 (which may be as shown in FIG. 2). An array of, for example, three transducers S1, S2, S3 is provided in front of and below the edge of target 596. Two arrangements as shown in FIG. 21 are located in front of target 596 to generate respective light curtains 608, 608' and produce output signals 618, 618' indicating the time at which the bullet passes through the respective light curtains: Since the spacing between the light curtains 608, 608' is known in advance, the time difference may be employed to determine the velocity of the bullet in a direction normal to the measurement plane. The calculated velocity and the speed of sound in air (as separately measured or determined) may be employed with the output signals from transducers S1–S3 to determine the location at which the bullet trajectory passes through the measurement plane. An inertia switch or other target impact detector may be used, as described above, for registering an actual hit on the target.

Those skilled in the art will readily recognize the manner in which the BASIC programs of Appendix A may be modified for use with an arrangement as shown in FIG. 20. The skilled artisan will also recognize that, for example, light curtain 608' may be deleted and the velocity of the bullet may be determined from the output 618 of photoelectric cell 615 and the output of transducer S2 of FIG. 20.

Those skilled in the art will also recognize that marksmanship training may be further enhanced by combining the use of the arrangements described herein with a rifle equipped with pressure sensors at critical points as described in U.S. Patent Application No. 835,431, filed Sept. 21, 1977 (the content of which is incorporated herein by reference). For example, the rifle used by the marksman may be equipped with pressure sensitive transducers located at the parts of the rifle that are contacted by the marksman when the rifle is being fired. Thus, a transducer is located at the butt of the rifle to indicate the pressure applied by the shoulder of the marksman, a transducer is provided at the cheek of the rifle to indicate the pressure applied by the cheek of the marksman, and transducers are provided at the main hand grip and the forehand grip of the rifle. The outputs of the transducers are coupled to suitable comparator circuits as described in U.S. Patent Application No. 835,431 and the comparator output signals then indicate whether the pressure applied by the marksman at each critical point on the rifle is less than, greater than, or within a predetermined desired range. While a display as described in U.S. Patent Application Ser. No. 835,431 may be employed for indicating whether the pressure applied by the marksman to the rifle at each point is correct, it will be understood that the comparator output signals may alternatively be provided to minicomputer 70 in a suitable format so that the visual display unit 72 of FIG. 4 will display a graphic representation of the rifle and indication thereon of the pressure applied by the trainee marksman to the rifle. This graphic display may be in addition to a graphic display of the target being fired upon and representations thereon of the location at which each bullet has struck or passed by the target. Such an arrangement provides the marksman with an almost instantaneous indication of the manner in which he is holding the rifle and of his shooting accuracy, and permits rapid diagnosis of any difficulties he may be having with his shooting. If a switch is mounted on the rifle for actuation when the trigger is pulled as described in U.S. Patent Application Ser. No. 835,431, the visual display unit 72'' may be made to indicate the pressure applied to the various pressure transducers on the rifle at the precise instant of firing the rifle. The display may be maintained on the display unit for a predetermined period of time and then erased so the trainee may proceed with firing a further round.

The addition of the pressure sensitive system enables the simultaneous display of pressure indications together with the projectile position and for positive target hit indication and/or ricochet indication. Such a simultaneous display has unique advantage in providing the trainee immediately not only with an indication of where the projectile has passed in relation to the target, but why the projectile passed through its displayed position. This information provides immediate positive and negative reinforcement of marksmanship techniques with respect to the correct grip and aim of the weapon to permit rapid learning of correct skills.

Figure 23:
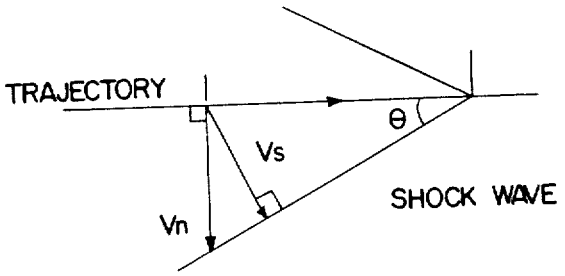
FIG. 23 shows a plane through the trajectory of a projectile.

An alternate non-iterative mathematical solution for calculation of "hit" coordinates (x,y) is as follows, and does not require that the airborne-shock-wave-detecting transducers be equally spaced (as is the case for transducers S1, S3, S4, in the solution given above with reference to FIG. 3);

It is assumed that the transducer array is horizontal, the measurement plane is vertical and parallel to the transducer array, and that the projectile trajectory is normal to the measurement plane. For a supersonic projectile travelling at a velocity Vb, the propagation velocity (Vn) of the airborne shock wave in the measurement plane can be calculated as follows (with reference to FIG. 23, showing a plane through the trajectory);

$$\sin\theta = Vs/Vb \tag{14}$$

$$Vn = Vb\tan\theta \tag{15}$$

Figure 24:
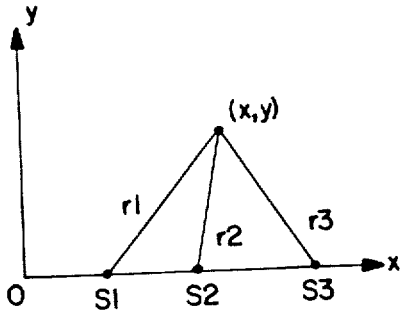
FIG. 24 shows an x, y measurement plane in which transducers are located.

FIG. 24 shows the x, y measurement plane in which transducer locations S1, S2, S3, are as indicated. Point (x, y) is the intersection point of the projectile trajectory with the x, y measurement plane, and r1, r2, r3 are the respective distances from point (x, y) to transducer locations S1, S2, S3 of FIG. 24. Then:

$$\left.\begin{aligned} r1^2 &= y^2 + x^2 + S1^2 - 2x\,S1 \\ r2^2 &= y^2 + x^2 + S2^2 - 2x\,S2 \\ r3^2 &= y^2 + x^2 + S3^2 - 2x\,S3 \end{aligned}\right\} \tag{16}$$

Therefore:

$$\left.\begin{aligned} r1^2 - r2^2 &= (S1^2 - S2^2) - 2x(S1 - S2) \\ r2^2 - r3^2 &= (S2^2 - S3^2) - 2x(S2 - S3) \end{aligned}\right\} \tag{17}$$

With arbitrary timing origin:

$$\left.\begin{aligned} r1 &= (t1 - T)\,Vn \\ r2 &= (t2 - T)\,Vn \\ r3 &= (t3 - T)\,Vn \end{aligned}\right\} \tag{18}$$

Therefore:

$$\left.\begin{aligned} r1^2 - r2^2 &= (t1^2 - t2^2)\,Vn^2 - 2(t1 - t2)TVn^2 \\ r2^2 - r3^2 &= (t2^2 - t3^2)\,Vn^2 - 2(t2 - t3)TVn^2 \end{aligned}\right\} \tag{19}$$

Substituting (19) in (17), dividing through by $Vn^2$ and rearranging:

$$\begin{aligned} 2(t1 - t2)T - 2(S1 - S2)(x/Vn^2) &= t1^2 - t2^2 + (S2^2 - S1^2)/Vn^2 \\ 2(t2 - t3)T - 2(S2 - S3)(x/Vn^2) &= t2^2 - t3^2 + (S3^2 - S2^2)/Vn^2 \end{aligned} \tag{20}$$

Letting $1/Vn^2 = B$, then:

$$\begin{pmatrix} 2(t1 - t2) - 2B(S1 - S2) \\ 2(t2 - t3) - 2B(S2 - S3) \end{pmatrix} \cdot \begin{pmatrix} T \\ x \end{pmatrix} = \begin{pmatrix} t1^2 - t2^2 - B(S1^2 - S2^2) \\ t2^2 - t3^2 - B(S2^2 - S3^3) \end{pmatrix} = A \cdot X = B \tag{21}$$

Thus: $X = A^{-1} \cdot B$

If this is solved for $X = \begin{pmatrix} T \\ x \end{pmatrix}$ then $x = X(2,1)$ (22)

and $y = \sqrt{r1^2 - (x - S1)^2}$ from (16) (23)

Thus $y = \sqrt{(t1 - T)^2 Vn^2 - (x - S1)^2}$

Thus $y = \sqrt{\dfrac{(t1 - X(1,1))^2 - B(X(2,1) - S1)^2}{B}}$

Appendix "E" of U.S. Pat. No. 4,307,292, hereby incorporated herein by reference and hereinafter referred to as Appendix E, is a computer program in BASIC programming language for implementing the mathematical "hit" coordinate solution just described.

Figure 25:
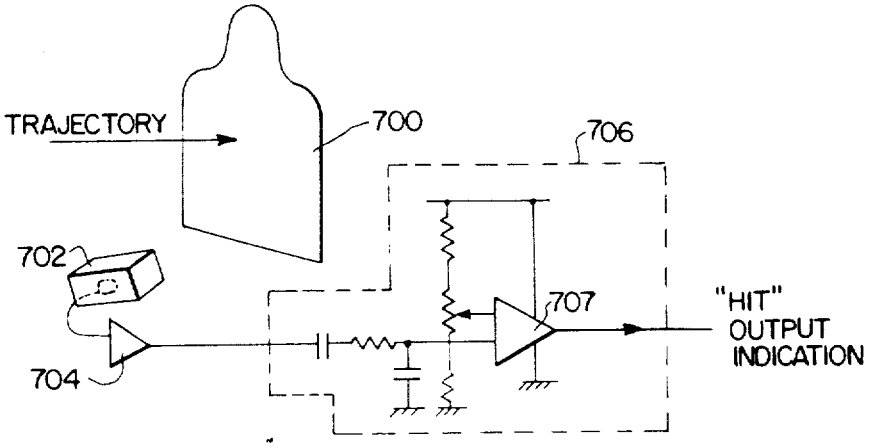
FIGS. 25 and 26 show an arrangement for sensing impact of a projectile on a target member.
Figure 26:
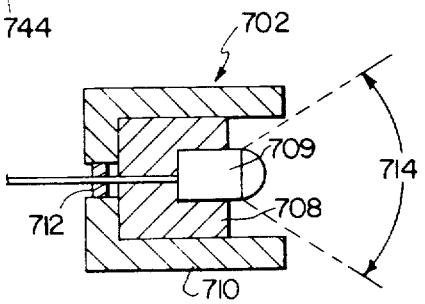

It is not necessary to employ an inertia switch to detect a "hit" of the projectile on a target member. Other apparatus may also be employed for this purpose. For example, FIGS. 25–26 show an arrangement for sensing impact of a projectile on a target member 700 employing a sensor assembly 702 positioned in front of the rigid target member 700. The rigid target member 700 may be of any desired shape and may be constructed, for example, of plywood or ABS material. Sensor 702 includes a transducer mounted within a shrouded housing which prevents any airborne shock wave of a supersonic projectile from being detected. The output of the shrouded sensor assembly 702 is provided through an amplifier 704 (available from Australasian Training Aids, Part No. 915-000). The output of amplifier 704 is provided through a suitable signal processing circuit 706, which provides a "hit" output indication. Signal processing circuit 706 may comprise essentially a threshold detector such as type LM710. Shrouded sensor assembly 702 may comprise a transducer 709 (as described above with reference to FIGS. 13–14) mounted in a block of acoustic isolating material 708 (such as described above with reference to FIG.

15). The block of acoustic isolating material is, in turn, mounting in a housing or shroud 710, with the transducer 709 recessed to provide a restricted arc of sensivity of the transducer which is appropriate to just "see" the face of target 700 when sensor assembly 702 is appropriately positioned relative to the target member 700. A coaxial cable from transducer 709 passes through an opening in shroud 710 and may be isolated from vibration by a silicone rubber ring 712, or the like. It will be understood that the threshold level of detector 707 in FIG. 25 is to be appropriately set so that disturbances of the target detected by transducer 709 will produce a "hit" output indication from signal processing circuit 706 only when the amplitude of the detected disturbance is sufficiently great to indicate that the disturbance of the target was caused by a projectile impacting on or passing through target member 700.

Figure 27:
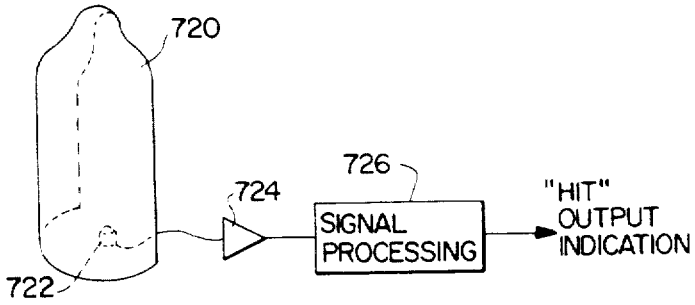
FIGS. 27 and 28 show an alternative arrangement for detecting a projectile hit on a target member.

A further arrangement for determining projectile "hits" on a rigid target member will now be described with reference to FIGS. 27, 28, and 29A–29B. FIG. 27 shows a rigid target member 720 which has substantial curvature in horizontal cross-section. A sensor 722 (which may be a transducer mounted in an acoustic isolating block as described above with reference to FIGS. 13–15) is located behind the rigid target member 720 and preferably within the arc of curvature thereof. The output of transducer 722 is supplied to an amplifier 724 (ATA Catalog No. 915-000), the output of which is in turn provided to a signal processing circuit 726 for providing a "hit" output indication.

Figure 28:
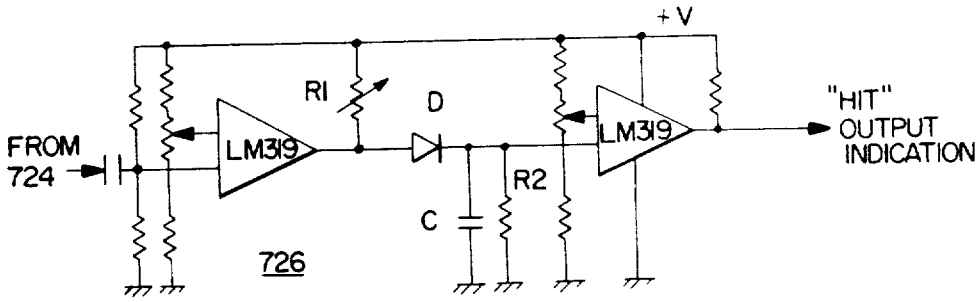
Figure 29A:
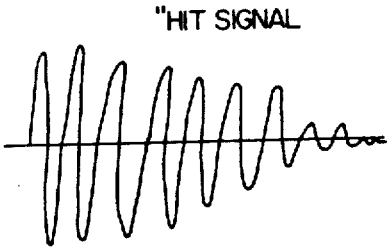
FIGS. 29A and 29B show typical transducer output signals for "hits" and "misses" of a projectile passing relative to the target member, respectively.
Figure 29B:
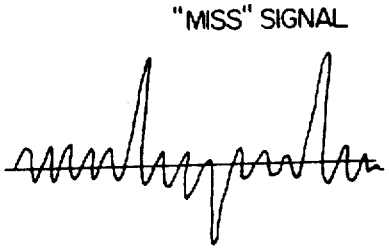

One possible arrangement for the signal processing circuit 726 is shown in FIG. 28. It has been found that genuine "hits" on the target by a projectile result in electrical signals from the transducer 722 consisting of a number (typically greater than 10) of large amplitude pulses closely spaced, while misses or hits by stones, debris, etc., either cause low amplitude signals or low amplitude signals with only occasional high amplitude "peaks." Typical "hit" and "miss" wave forms are shown in FIGS. 29A and 29B, respectively. The signal processing circuit 726 of FIG. 28 operates on these signals as follows:

The first stage acts to impose a preset voltage amplitude "window" or threshold on the incoming wave form. By suitable adjustment this can be arranged to suppress all the low-amplitude content of "miss" signals, allowing only the high amplitude parts thereof to pass. When the first stage threshold is exceeded, the output stage of the first LM319 integrated circuit goes to a high impedance state. As a result, the current flowing in resistor R1 of FIG. 28 is transferred to flow through the diode D and into capacitor C, causing the voltage on the latter to begin to rise. As soon as this voltage rises, however, resistor R2 begins to "bleed" current one of capacitor C. As a result, only if the incoming signal succeeds in overcoming the threshold at a sufficiently rapid rate will the voltage on capacitor C rise significantly. Thus, the sporadic "peaks" present in "miss" signals will cause the voltage at this point to rise to any significant extent. However, "hit" signals, comprising many pulses in rapid succession will cause the voltage on capacitor C to increase when sufficient pulses have occurred, the voltage on capacitor C will thus rise until it exceeds the preset threshold on the second comparator, when its output will change indicating a "hit".

The technique for distinguishing "hit" from "miss" described above with reference to FIG. 28 applies in principle to any combination of rigid target and sensor, but has particular benefit was used with a 3-dimensional type target such as that shown in FIG. 27 or such as a target which completely encircles the transducer (such as a conically-shaped target member). By virtue of the shape of the 3-dimensional targets, existing mechanical hit registrations systems, such as inertia switches, often cannot be used to detect hits on the target because vibration transmission within the target may be relatively poor. Secondly, the curved shape of the target provides very effective screening of the sensor from the airborne shock wave produced by near-missed supersonic projectiles. The curvature of the target can be increased to the point where it forms a complete shell with the sensor positioned inside it thus enabling hit detection from any direction of fire. Any of a number of materials can be used for the target member 720, including plywood, polyethylene, and expanded polystyrene (the latter being of particular benefit because of its very low cost and ease of molding it into complex shapes).

Figure 30:
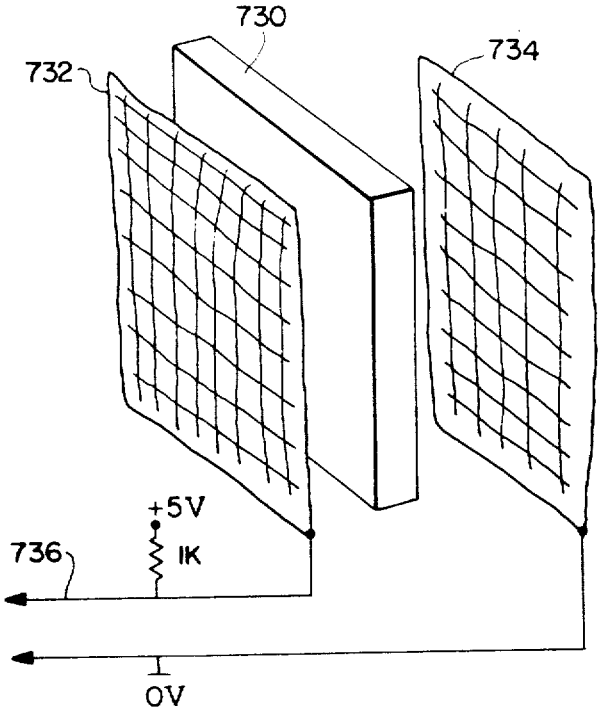
FIG. 30 shows a target member construction for detecting passage of a projectile therethrough.

Still another apparatus for detecting a projectile "hit" (i.e. passage through a target member) is illustrated in FIG. 30. In this embodiment, the target member comprises a sheet of suitable electrically insulating spacer material 730, such as 6 mm thick "Plastazote" available from Bakelite-Xylonite Ltd., 8 Grafton Street, London, U.K. The sheet 730 may be of any desired size. Metal meshes 732, 734 (such as Part No. 200/22, available from Cyclone, K.M. products P/C, 220 East Boundary Road, East Bentleigh, Victoria, Australia) are cemented to the insulating spacer sheet 730 (such as with 3M" brand "Fast Bond" contact cement). As a bullet passes through the "sandwich" target comprising bonded-together members 730–734, electrical contact between metal meshes 732, 734 is established, so that the voltage at point 736 drops momentarily from +5 volts to 0 volts, thereby indicating passage of the bullet through the target "sandwich."

Figure 31:
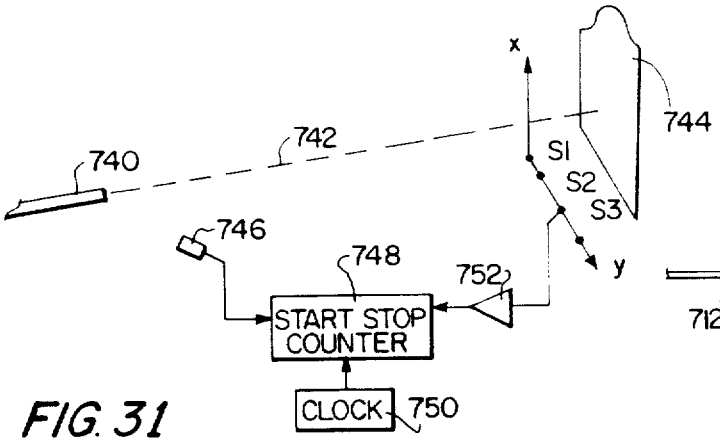
FIG. 31 shows an alternative arrangement for determining projectile velocity.

Still other apparatus is possible for determining the velocity of the projectile, such as shown in FIG. 31. A projectile fired from a weapon 740 travels along a trajectory 742 toward a target member or target zone 744. An array of transducers S1, S2, S3 is located below one edge of the target member or zone 744. For determining the velocity of the projectile, a detector 746 is positioned to sense the time of discharge of the projectile from the weapon and provide a signal which starts a counter 748. Counter 748 is supplied with pulses from a clock generator 750 and counts the clock pulses until a signal is received from transducer S2 through an amplifier 752 for stopping the counter.

It is known that projectiles, such as bullets, decelerate in a well-defined and consistent manner. This deceleration can be expressed in terms of loss of velocity per unit distance travelled along the trajectory, the deceleration being substantially constant from sample to sample of high quality ammunition (such as most military ammunition) and being substantially independent of velocity. At any point along its trajectory, the projectile velocity $V_t$ is:

$$V_t = V_m - d.k$$

where $V_t$ = projectile velocity at point in question $V_m$ = nominal velocity or projectile at weapon or known origin d = distance from muzzle (or known origin) to point in question k = above-mentioned "deceleration" constant By simple algebra, it is possible to find an expression for distance travelled in a given time, which is:

$$d(t) = V_m e^{-kt}$$

where t is the independent variable of time. For good quality ammunition the constant "k" is well controlled, and can be predetermined with good accuracy. Thus, the only "unknown" is $V_m$, which will vary from round to round.

The arrangement according to FIG. 31 operates to determine a notional value for $V_m$ by measuring the time of flight of the projectile from the weapon to the array. The preceding equation permits $V_m$ to be computed and, once obtained, permits $V_t$ in the vicinity of the transducer array to be calculated. Detector 746 may be an optical detector sensing the weapon discharge muzzle flash, or an acoustic device responding to the muzzle blast and/or supersonic projectile shock wave.

Appendix F of U.S. Pat. No. 4,307,292 hereby incorporated herein by reference and referred to below as Appendix F contains a listing of a BASIC program providing graphic display of projectile position and target "hit" scoring assessment for three zones in the target area. The program is written to operate under CONTROLLER BASIC with the already-described special CALL statement subroutine and generates its graphic output on an applied Digital Data Systems Model MRD 450 graphics generator in combination with any compatible visual display unit, such as Model 222A available from V.G.M. Vidiaids Ltd., Clocktower Road, Isleworth, Middlesex, TW7 6 DU, U.K. Lines 1–35 of Appendix F initialize program selection of various options, Execution then jumps to line 1000. Lines 1000–1385 collect data from one firing, and calculate shot status and position. Execution jumps to line 49. Lines 49–96 comprise the first stage of the graphic display, which converts x, y shot coordinates to suitable form to address the correct area of the visual display screen. Execution then jumps to line 301. Lines 301–316 check whether the shot is a ricochet or whether the intended display position is actually within the available area.

Figure 32:
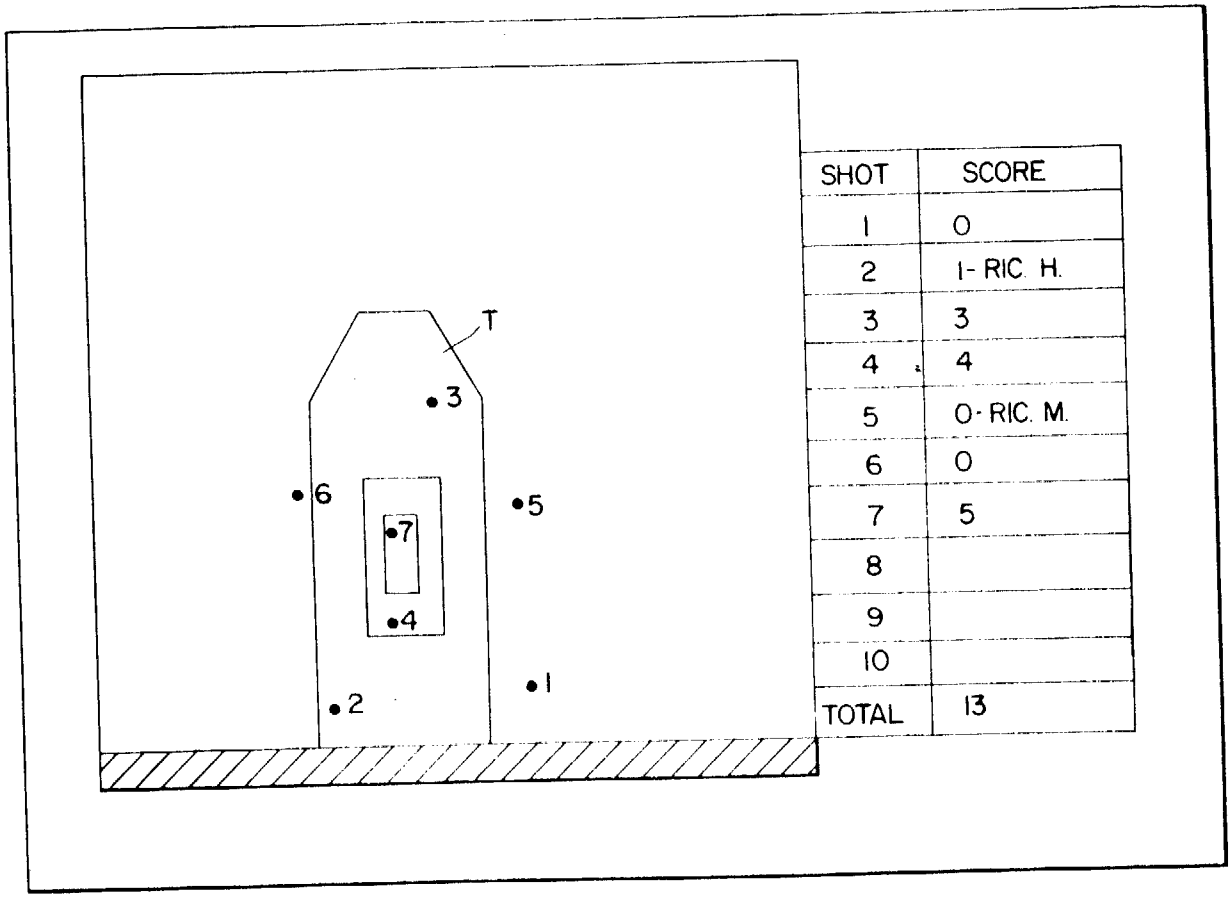
FIG. 32 shows a graticule overlay used on the visual display screen of FIG. 4.

Depending on the result of these checks, the program on lines 111–251 and 331–431 assembles the appropriate graphics character with correctly formatted positioning commands and outputs the resulting string of data to the MRD 450 generator. Hit zone scoring is accomplished in line 461–596 and the result is displayed on another area of the screen. Line 616 checks whether less than the full group of ten shots has been fired and, if so, execution loops back to line 7700 for another shot. When the group is complete, the program erases the visual display screen completely and starts a fresh group of shots. FIG. 32 shows a graticule overlay used on the visual display screen when running the program of Appendix F.

FIG. 32 shows a graticule overlay used on the visual display screen 72'' of FIG. 4. A target T is provided as well as a separate score column for each shot. If the positive hit indication (inertia switch) is not actuated, a "0" score is indicated, otherwise a non-zero point score is displayed. The positive hit indication is particularly advantageous for borderline cases, as for example, shot No. 6. In such cases, it may not be clear from the position display alone whether a "hit" occurred. Shot No. 1 is shown as a clear miss; shot No. 2 as a ricochet hit, shot No. 5 as a ricochet miss and shot numbers 3, 4 and 7 as hits having different point values.

I claim:

1. Discriminatory hit detection apparatus for indicating when a target member has been hit by a projectile fired at said target member, comprising:

a target member;

transducer means spaced apart from and not physically connected to said target member for detecting and selectively providing a hit indication only in response to disturbance of said target member caused by said projectile hitting or passing through said target member and means responsive to said transducer means output for providing said hit indication only in response to disturbance of said target member caused by said projectile hitting or passing through said target member.

2. Apparatus according to claim 1, wherein said transducer means consists of at least one transducer whose output varies in amplitude depending upon the magnitude of disturbance of said target, and said circuit is operative to provide said hit indication only when said at least one transducer output amplitude exceeds a predetermined level.

3. Apparatus according to claim 2, wherein said means responsive to said transducer is a circuit which is further operative to provide said hit indication only when said at least one transducer output amplitude includes amplitude peaks which exceed said predetermined level at a rate exceeding a predetermined rate.

4. Apparatus according to claim 1, wherein said transducer means is responsive to air pressure disturbances caused by objects hitting or passing through said target member.

5. Apparatus according to claim 4, wherein said transducer means is located in front of said target member relative to a point from which said projectile is fired at said target member, further comprising means for shielding said transducer means such that said transducer means is responsive only to air pressure disturbances which propagate from the region of said target member toward said transducer means.

6. Apparatus according to claim 5, wherein said transducer means is located behind a front surface of said target member relative to a point from which said projectile is fired at said target member.

7. Apparatus according to claim 6, wherein said target member is three-dimensional and at least partially surrounds said transducer means, whereby said transducer means is shielded by said target member so as to be substantially non-responsive to air pressure disturbances caused by projectiles passing by but not hitting said target member.

8. Apparatus according to claim 7, wherein said target member surrounds said transducer means.

9. Apparatus according to claim 1, wherein said target member is three-dimensional and at least partially surrounds said transducer means, said target member comprising at least a portion of a cylinder.

10. Apparatus according to claims 1, 4–8 or 9, wherein said projectile travels along a trajectory from a firing point toward said target member and through a measurement plane, further comprising:

means, including said transducer means and said means responsive to said transducer means, for detecting and indicating relative to a target representation a location in said measurement plane through which said trajectory passes, thereby providing at least an approximate indication of where said projectile passes relative to said target member, whereby a marksman is provided with at least an approximate indication of where the projectile passes relative to the target member, as well as a positive indication of whether the projectile has hit the target member, thereby rendering hits at the edge of the target member distinguishable from misses near the edge of the target member.

11. Apparatus of claim 9 wherein said target member surrounds said transducer means.

12. Apparatus according to claims 6, or 7, or 8, or 9 or 11 wherein said transducer means comprises a single transducer.

13. Apparatus according to claim 12 wherein said transducer is positioned proximate to a base of said target.

14. Apparatus according to claim 10, wherein said projectile travels at a supersonic velocity and said location detecting and indicating means comprises:

an array of at least three transducers responsive to an airborne shock wave from the supersonic projectile and located at respective predetermined portions spaced along a line substantially parallel to said measurement plane;

means for measuring velocity of the supersonic projectile;

means for measuring velocity of propagation of sound in air in the vicinity of the array of transducers; and computing means responsive to said array of transducers, said projectile velocity measuring means, and said propagation velocity measuring means, and operative for:

determining the location in said plane through which the trajectory of the supersonic projectile passes, and providing an output indicating said determined location relative to a target representation.

15. Apparatus according to claim 14 wherein said projectile velocity is measured in the vicinity of said target member, further comprising means for:

comparing said measured velocity with at least one expected projectile velocity value to ascertain if said measured velocity is within an expected projectile velocity range; and providing an indication of the result of said comparison between said measured velocity and said at least one expected velocity value, whereby a marksman is further provided with an indication of whether a detected hit on said target has resulted from a free flight projectile hitting said target member or from a projectile which has ricocheted prior to hitting said target member.

16. Apparatus according to claim 10 further comprising means for:

measuring a velocity of the projectile in the vicinity of the target member;

comparing said measured velocity with at least one expected projectile velocity value to ascertain if said measured velocity is within an expected projectile velocity range; and providing an indication of the result of said comparison between said measured velocity and said at least one expected velocity value, whereby a marksman is further provided with an indication of whether a detected hit on said target has resulted from a free flight projectile hitting said target member or from a projectile which has ricocheted prior to hitting said target member.

17. Apparatus according to claim 16 further comprising means responsive to said detecting and indicating means for providing a visual representation of said target member for graphically displaying said detected location relative to said target member representation.

18. Apparatus according to claim 17 wherein said graphic display means-comprises a visual display screen fitted with a graticule bearing said target representation, said visual display screen displaying a visible mark relative to said graticule to indicate said detected location.

19. Apparatus according to claim 18 wherein in said graphic display means is further responsive to said hit detecting means for displaying a positive *visual indication of whether said projectile has hit said target member.*

*20. A discriminatory hit detection apparatus for indicating when a target member has been hit by a projectile fired at said target member, comprising:*

*a target member;*

*transducer means spaced apart from and not physically connected to said target member for detecting and selectively providing a hit indication only in response to said projectile hitting or passing through said target member; and*

*means responsive to said transducer means output for providing said hit indication only in response to said projectile hitting or passing through said target member.*

*21. Apparatus according to claim 20 wherein said transducer means comprises at least one transducer whose output varies in amplitude depending upon the magnitude of disturbance of said target, said circuit being operative to provide said hit indication only when said at least one transducer output amplitude exceeds a predetermined level.*

*22. Apparatus according to claim 20, wherein said transducer means is responsive to air pressure disturbances caused by objects hitting or passing through said target member.*

*23. Apparatus according to claim 22, wherein said transducer means is located behind a front surface of said target member relative to a point from which said projectile is fired at said target member.*

*24. Apparatus according to claim 23, wherein said target member is three-dimensional and at least partially surrounds said transducer means, whereby said transducer means is shielded by said target member so as to be substantially non-responsive to air pressure disturbances caused by projectiles passing by but not hitting or passing through said target member.*

*25. Apparatus according to claim 24, wherein said target member surrounds said transducer means.*

*26. Apparatus according to claim 20, wherein said target member is three-dimensional and at least partially surrounds said transducer means, said target member having a generally cylindrical form.*

*27. Apparatus according to claim 20 wherein said projectile travels along a trajectory from a firing point toward said target member and through a measurement plane, and further comprising:*

*means for detecting and indicating, relative to said target member, a location in said measurement plane through which said trajectory passes, thereby providing at least an approximate indication of where said projectile passes relative to said target member,*

*whereby a marksman is provided with at least an approximate indication of where the projectile passes relative to said target member, as well as a positive indication of whether the projectile has hit the target member, thereby rendering hits at the edge of the target member distinguishable from misses near the edge of the target member.*

*28. Apparatus according to claim 27, wherein said location detecting and indicating means comprises:*

*an array of at least three transducers responsive to an airborne pressure wave from the projectile, said array being located at predetermined points spaced along a line substantially parallel to said measurement plane;*

*means for measuring a velocity of propagation of sound in air in the vicinity of the array of said array of transducers; and*

*computing means, responsive to said array of transducers and said propagation velocity measuring means, and operable for:*

*determining the location in said plane through which the trajectory of the projectile passes, and*

*providing an output indicating said determined location relative to a target representation.*

*29. An apparatus for use in marksmanship training to provide a hit indication of a projectile hitting or passing through a target comprising:*

*an acoustic transducer responsive to vibrations or disturbances caused by the projectile hitting or passing through the target, said transducer being positioned behind and not physically connected to a front surface of the target relative to the direction of approach of said projectile to the target, and*

*a circuit means responsive to an output of said acoustic transducer for providing said hit indication only when a projectile hits or passes through said target.*

*30. Apparatus according to claim 29, wherein said acoustic transducer output varies in amplitude depending upon the magnitude of said vibrations or disturbances, said circuit means being operative to provide said hit indication only when said acoustic transducer output amplitude exceeds a predetermined level.*

*31. Apparatus according to claim 30 wherein said acoustic transducer is responsive to air pressure disturbances.*

*32. Apparatus according to claim 31, wherein said target is three-dimensional and at least partially surrounds said acoustic transducer to thereby shield said acoustic transducer from air pressure disturbances caused by projectiles passing by but not hitting or passing through said target.*

*33. Apparatus according to claim 32, wherein said target substantially surrounds said acoustic transducer.*

* * * * *